US006477702B1

(12) United States Patent
Yellin et al.

(10) Patent No.: US 6,477,702 B1
(45) Date of Patent: *Nov. 5, 2002

(54) BYTECODE PROGRAM INTERPRETER APPARATUS AND METHOD WITH PRE-VERIFICATION OF DATA TYPE RESTRICTIONS AND OBJECT INITIALIZATION

(75) Inventors: Frank Yellin, Redwood City, CA (US); James A. Gosling, Woodside, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 78 days.

This patent is subject to a terminal disclaimer.

(21) Appl. No.: 09/711,053

(22) Filed: Nov. 9, 2000

Related U.S. Application Data

(63) Continuation of application No. 09/454,821, filed on Dec. 6, 1999, which is a continuation of application No. 09/046,719, filed on Mar. 24, 1998, now Pat. No. 5,999,731, which is a continuation of application No. 08/575,291, filed on Dec. 20, 1995, now Pat. No. 5,740,441, which is a continuation-in-part of application No. 08/360,202, filed on Dec. 20, 1994, now Pat. No. 5,748,964.

(51) Int. Cl.[7] .............................................. G06F 9/45
(52) U.S. Cl. ........................................................ 717/126
(58) Field of Search ........................................ 717/126

(56) References Cited

U.S. PATENT DOCUMENTS

| 3,878,513 | A | 4/1975 | Werner ........................ 711/154 |
| 4,521,851 | A | 6/1985 | Trubisky et al. ............. 712/218 |
| 4,524,416 | A | 6/1985 | Stanley et al. ............... 711/200 |
| 4,622,013 | A | 11/1986 | Cerchio ........................ 434/118 |
| 4,742,215 | A | 5/1988 | Daughters et al. ........... 235/380 |
| 5,165,465 | A | 11/1992 | Kenet ........................ 165/11.1 |
| 5,179,734 | A | 1/1993 | Candy et al. ................. 712/1 |

(List continued on next page.)

FOREIGN PATENT DOCUMENTS

| EP | 0 424 056 A2 | 10/1990 |
| EP | 0 718 764 A2 | 12/1995 |

OTHER PUBLICATIONS

Mili et al., A system for Classifying Program Verification . . . , 1984, IEEE, p. 499–509.*
Gumb, R., A First Course in Program Verification . . . 1989, ACM, p. 146–150.*
Kamikawai et al., A Critical Path System, 1981, IEEE, p. 118–123.*
Ahamed et al., "An Application of Name Based Addressing to Low Level Distributed Algorithms," Jan. 1985, IEEE Transactions On Software Engineering, vol. SE–11, No. 1, p59.
Adobe Systems Inc., "PostScript Language Reference Manual Second Edition," 1990, pp. 23–143.

(List continued on next page.)

Primary Examiner—Gregory Morse
Assistant Examiner—John Q. Chavis
(74) Attorney, Agent, or Firm—Pennie & Edmonds LLP

(57) ABSTRACT

A program interpreter for computer programs written in a bytecode language, which uses a restricted set of data type specific bytecodes. The interpreter, prior to executing any bytecode program, executes a bytecode program verifier procedure that verifies the integrity of a specified program by identifying any bytecode instruction that would process data of the wrong type for such a bytecode and any bytecode instruction sequences in the specified program that would cause underflow or overflow of the operand stack. If the program verifier finds any instructions that violate pre-defined stack usage and data type usage restrictions, execution of the program by the interpreter is prevented. After pre-processing of the program by the verifier, if no program faults were found, the interpreter executes the program without performing operand stack overflow and underflow checks and without performing data type checks on operands stored in operand stack. As a result, program execution speed is greatly improved.

172 Claims, 11 Drawing Sheets

U.S. PATENT DOCUMENTS

| | | | |
|---|---|---|---|
| 5,187,799 A | 2/1993 | McAuley et al. | 712/36 |
| 5,220,522 A | 6/1993 | Wilson et al. | 708/134 |
| 5,283,864 A | 2/1994 | Knowlton | 345/776 |
| 5,307,499 A | 4/1994 | Yin | 707/3 |
| 5,347,632 A | 9/1994 | Filepp et al. | 709/202 |
| 5,422,992 A | 6/1995 | Motoyama et al. | 707/516 |
| 5,446,875 A | 8/1995 | Ogisu et al. | 714/1 |
| 5,450,575 A | 9/1995 | Sites | 714/38 |
| 5,590,329 A | 12/1996 | Goodnow, II et al. | 717/132 |
| 5,640,503 A * | 6/1997 | Alpert et al. | 712/227 |
| 5,668,999 A * | 9/1997 | Gosling | 717/126 |
| 5,740,441 A * | 4/1998 | Yellin et al. | 717/118 |
| 5,748,964 A * | 5/1998 | Gosling | 717/126 |
| 5,925,125 A * | 7/1999 | Alpert et al. | 712/244 |
| 5,978,574 A * | 11/1999 | Sharma | 703/20 |
| 5,999,731 A * | 12/1999 | Yellin et al. | 717/126 |
| 6,075,940 A * | 6/2000 | Gosling | 717/126 |
| 6,247,171 B1 * | 6/2001 | Yellin et al. | 717/126 |

OTHER PUBLICATIONS

Almes et al., "*The Eden System: A Technical Review,*" Jan. 1985, IEEE Transactions On Software Engineering, vol SE–11, No. 1, pp. 43–58.

Almes, Guy. T, "*Integration and Distribution in the Eden System,*" Department of Computer Science, University of Washington Seattle, Technical Report 83–01–02, Jan. 19, 1983, pp. 1–18.

Almes, Guy. T, "*The Evolution of the Eden Invocation Mechanism,*" Department of Computer Science, University of Washington Seattle, Technical Report 83–01–03, Jan. 19, 1983, pp. 1–14.

Almes, Guy. T, "*Eden Project Proposal,*" Department of Computer Science, University of Washington Seattle, Technical Report 80–10–01, Oct. 1980, pp. i–ii.

Almes et al., "*Research in Integrated Distributed Computing,*" Department of Computer Science, University of Washington Seattle, Oct. 1979 pp. 1–42.

Almes et al., "*The Eden System: A Technical Review,*" Department of Computer Science, University of Washington Seattle, Technical Report 83–10–05, Oct. 1983, pp. 1–25.

Almes et al., "*Edmas: An Object–Oriented Locally Distributed Mail System,*" Department of Computer Science, FR–35 University of Washington Seattle, Technical Report 84–08–03, Dec. 13, 1984, pp. 1–19.

Almes et al., "*Edmas: A Locally Distributed Mail System,*" Department of Computer Science, University of Washington Seattle, Technical Report 83–07–01, Jul. 7, 1983, pp. 1–17.

Auerbach et al., "*High–Level Language Support for Programming Distributed Systems,*" IEEE Transactions On Software Engineering, 1992, p. 320.

Bertz, David., "*Drool Over A Little Language That Sports Multiple Inheritance,*" Dr. Dobb's Journal, v18, n11,p74(4), Oct. 1993.

Bertz, David., *Your Own Tiny Object–Oriented Language: C++? Smalltalk? What About Bob?* (*An interpreter formed from C++ and Lisp*) Dr. Dobb's Journal, Sep., 1991, v16, n9, p26(8).

Bertz, David., "*Embedded Languages : ExTalk Allows Users To Extend The Capabilities Of Your Application Programs,*" BYTE Nov., 1988; p. 419–423; vol. 13No. 12.

Black et al., "*A Language For Distributed Programming*" Department of Computer Science, University of Washington, Technical Report 86–02–03, Feb. 1986, p 10.

Black, Andrew P., "*The Eden Programming Language,*" Department of Computer Science, FR–35 University of Washington Seattle, Technical Report 85–09–01, Sep. 1985, pp. 1–19.

Black, Andrew P., "*Supporting Distributed Applications: Experience With Eden,*" University of Washington Seattle, Presentation at Tenth ACM Symposium on Operating System Principles, Sep. 1985, pp. 1–14.

Black et al., "*Distribution and Abstract Types in Emerald,*" Department of Computer Science, University of Washington Seattle, Technical Report 85–08–05, Aug. 1985, pp. 1–10.

Black et al., "*Distribution and Abstract Types in Emerald,*" IEEE Transactions On Software Engineering, Vol SE–13 No. 1 Jan. 1987, pp. 65–76.

Black et al., "*The Eden Project: A Final Report,*" Department of Computer Science, University of Washington Seattle, Technical Report 86–11–01, pp. 1–28.

Black et al., *Distribution and Abstract Types In Emerald*, University of Washington Seattle, Technical Report 86–02–04, pp. 1–189.

Black et al., "*Object Structure in the Emerald System,*" University of Washington Seattle, Technical Report 86–04–03, pp. 1–9.

Black, Andrew P. , "*Supporting Distributed Applications: Experience With Eden,*" Department of Computer Science, University of Washington Seattle, Technical Report 85–03–02, Mar. 1985, pp. 1–21.

Cardelli, L., "*The Amber Machine,*" Proceedings Of The Thirteenth Spring School Of The LITP Proceedings, 1986, pp. 48–70.

Chambers, Craig., "*An Efficient Implementation on SELF, A Dynamically–Typed Object Oreinted Language Based On Prototypes,*" Conference Proceedings, Special Issue of SIGPLAN Notices, vol. 24, No.: 10, Oct. 1989.

Chung et al., "*A "Tiny" Pascal Compiler Part 1: The P–Code Interpreter,*" BYTE Publications, Sep. 1978, pp. 58–65, 148–155.

Chung et al., "*A "Tiny" Pascal Pascal Compiler Part 2: The P–Compiler,*" BYTE Publications, Sep. 1978, pp. 34–52.

Duff, Charles B., "*Designing An Efficient Language,*" BYTE, Aug. 1986, p 211.

Franks, Neville., "*Adding An Extension Language To Your Software: The Little Language/Application Interface,*" Dr. Dobb's Journal, Sep. 1991, v16, n9, p34(6).

Goldberg et al., "*Smalltalk–80 The Language and its Implementation,*" Xerox Palo Alto Research Center pp 1–707.

Gosling et al., "*The Java Language Environment A White Paper,*" The Java Language Environment, Sun Microsystems, Oct. 1995, pp. 1–84.

Gosling, James., "*Java Intermediate Bytecodes*" ACM SIGPLAN Workshop On Intermediate Representations (IR '95), Jan. 1995, San Francisco, ACM SIGPLAN Notices, vol. 30, No. 3, Mar. 1995 pp. 111–118.

Gosling, James., "*System And Method For Pre–Verification Of Stack Usage In ByteCode Program Loops*", US Application Ser. No.: 08/359,882, Filed Dec. 20, 1994 pp 1–38 Fig 1–5.

Gosling, James., "Bytecode Program Interpreter Apparatus And Method With Pre–Verification Of Data Type Restrictions", US Application Ser. No.: 08/360,202, Filed Dec. 21, 1994 pp 1–41.

Guibas et al., "*Compilation and Delayed Evaluation in APL,*" Fifth Annual ACM Symposium On Principles Of Programming Languages, Jan. 23–25, 1978, 1–8.

Guttman et al., "The VLISP Verified Scheme System," LISP And Symbolic Computation: An International Journal, 8, 1995, pp. 33–110.

Grimaud et al., "FACADE: A Typed Intermediate Language Dedicated To Smart Cards," Software Engineering Notes, Association For Computing Machinery. New York, US, vol. 24, No. 6, Sep. 6, 1999, pp. 476–493.

Holman et al., "The Eden Shared Calendar System," Department of Computer Science, FR–35, University of Washington Seattle, Technical Report 85–05–02, Jun. 22, 1985, pp. 1–14.

Hutchison, Norman C., "An Object Based Language for Distributed Programming," University of Washington, Dissertation for Doctor of Philosophy, 1987, pp. 1–103.

Hsu, Felix Shamson., "Reimplementing Remote Procedure Calls," University of Washington, Masters Thesis, 1985, pp. 1–76.

Johnston, Robert L., "The Dynamic Incremental Compiler of APL/3000," Association of Computing Machinery, May 30–Jun. 1, 1979, vol. 9 No. 4–Part 1, pp. 82–87.

Jul et al., "Fine–Grained Mobility in the Emerald System," University of Washington, ACM Transactions On Computer Systems, vol. 6, No. 1., Feb. 1988, pp. 109–133.

Jul, Eric., "Object Mobility in a Distributed Object Oriented System," University of Washington, Dissertation for Doctor Of Philosophy, 1989, pp. 1–154.

Kinchin, Corinna., "Postscript: P.S. it's a programming language too!" EXE, v6,n1, Jun. 1991, p66(5).

King, James C., "A Program Verifier," IBM Thomas J. Watson Research Center. Yorktown Heights, New York 10598, USA.

Korfhage et al., "Hermes Language Experiences," Software–Practice and Experience, vol. 25(4), Apr. 1995, p. 389.

Krasner, Glen., "Smalltalk–80 Bits of History, Words of Advice," Xerox Palo Alto Research Center, 1983, pp. 1–343.

Lazowska et al., "The Architecture of the Eden System," Proceedings of the Eighth Symposium On Operating System Principles, Dec. 14–16, 1981, Asilomar Conference, Pacific Grove, California, Dec. 1981, vol. 15, No. 5.

McDaniel, Gene., "An Analysis of a Mesa Instruction Set," Association for Computing Machinery, Xerox Palo Alto Research Center, May 1982.

Mitchell et al., "Mesa Language Manual," Xerox Palo Alto Research Center, Palo Alto, California pp. 1–147.

Perrott et al., "A Supercomputer Program Development System," Software–Practice and Experience, Oct. 1987, vol. 17 (10), pp. 663.

Pier, Kenneth A., "A Retrospective on the Dorado, A High–Performance Personal Computer," Association for Computing Machinery, Xerox Palo Alto Research Center, 1983, pp. 252–269.

Pu, Calton., "Replication and Nested Transactions in the Eden Distributed System.," University of Washington, Department of Computer Science, Dissertation for Doctor of Philosophy, 1986, pp. 1–179.

Proudfoot, Andrew Blaine., "Replects: Data Repliation in the Eden System," University of Washington, Department of Computer Science, Technical Report No. TR–85–12–04, pp. 1–154.

Rose et al., "Lightweight ByteCode Verification", Extended Abstract For FUJ'98, Sep. 21, 1998, pp 1–23.

Schauer, von. H., "Architektur und Implementierung eines PASCAL–Systems fur Mikrocomputer," Elektronische Rechenanlagen, vol. 24 (1982), Jun., No. 3, pp. 108.

"A Postscript Backgrounder," Seybold Report on Desktop Publishing, vol. 5, No. 7, Mar. 4, 1991 p. 9(1).

Strom et al., "NIL: An Integrated Language and System For Distributed Programming," Association for Computing Machinery, 1983, p. 73.

Strom et al., "Extending Typestate Checking Using Conditional Liveness Analysis." IEEE Transactions On Software Engineering, vol. 19, No. 5, May 1993, pp. 478.

Thompson, Ken., "Regular Expression Search Algorithm," Communications of the ACM, vol. 11, No. 6, Jun. 1968, pp. 419–422.

Unagar et al., "Object, Message, and Performance: How They Coexist In Self," Computer, vol. 25 No. 10, Oct. 1, 1992, pp. 53–64.

Wright et al., "A Practical Soft Type System for Scheme," LISP 94, Jun. 1994, Orlando, Florida, pp 250–262.

Yellin, Dan., "Do Programmers Need Seat Belts?" ACM SIGPLAN Debates (1996), pp 5.

Ken Thompson, "Regular Expression Search Algorithm," Communications of the ACM, Jun., 1968, vol. 11, No. 6, pp. 419–422.

Kin–Man Chung and Herbert Yuen, "A 'Tiny' Pascal Compiler; Part 1: The P–Code Interpreter," BYTE Publications, Inc., Sep. 1978.

Kin–Man Chung and Herbert Yuen, "A 'Tiny' Pascal Compiler; Part 2: The P–Compiler," BYTE Publications, Inc., Oct. 1978.

Gene McDaniel, "An Analysis of a Mesa Instruction Set," Association for Computing Machinery, May 1982.

Kenneth A. Pier, "A Retrospective on the Dorado, a High–Performance Personal Computer," IEEE Computer Society, $10^{th}$ Annual Intl. Symposium on Computer Architecture, 1983, pp. 252–269.

James G. Mitchell, et al., "Mesa Language Manual," Xerox Corporation, Palo Alto Research Center.

Kaoru Takahashi et al., Validating Network Protocols Using a Flexible Verifier, IEEE, 1994, p. 811–817.

Timothy Shih et al., "An Automated Design Specification and Verification Tool for Systolic Architectures", IEEE, 1992, pp. 6–17.

Douglas A. Stuart, "Implementing a Verifier for Real–Time Systems", IEEE 1990, pp 62–71.

Farn Wang et al., "A Verifier for Distributed Real–Time Systems with Bounded Integer Variables", IEEE 1993, pp 135–151.

* cited by examiner

BYTECODE PROGRAM INTERPRETER APPARATUS AND METHOD WITH PRE-VERIFICATION OF DATA TYPE RESTRICTIONS AND OBJECT INITIALIZATION

This application is a continuation of patent application Ser. No. 09/454,821, filed Dec. 6, 1999, which was a continuation of patent application Ser. No. 09/046,719, filed Mar. 24, 1998, now U.S. Pat. No. 5,999,731, which was a continuation of patent application Ser. No. 08/575,291, filed Dec. 20, 1995, now U.S. Pat. No. 5,740,441, which was a continuation-in-part of patent application Ser. No. S/N 08/360,202, filed Dec. 20, 1994, now U.S. Pat. No. 5,748,964.

The present invention relates generally to the use of computer software on multiple computer platforms which use distinct underlying machine instruction sets, and more specifically to an program verifier and method that verify the integrity of computer software obtained from a network server or other source.

BACKGROUND OF THE INVENTION

Referring to FIG. 1, in a networked computer system 100, a first computer 102 may download a computer program 103 residing on a second computer 104. In this example, the first user node 102 will typically be a user workstation (often called a client) having a central processing unit 106, a user interface 108, memory 110 (e.g., random access memory and disk memory) for storing an operating system 112, programs, documents and other data, and a communications interface 114 for connecting to a computer network 120 such as the Internet, a local area network or a wide area network. The computers 102 and 104 are often called "nodes on the network" or "network nodes".

The second computer 104 will often be a network server, but may be a second user workstation, and typically would contain the same basic array of computer components as the first computer.

In the prior art (unlike the system shown in FIG. 1), after the first computer 102 downloads a copy of a computer program 103 from the second computer 104, there are essentially no standardized tools available to help the user of the first computer 102 to verify the integrity of the downloaded program 103. In particular, unless the first computer user studies the source code of the downloaded program, it is virtually impossible using prior art tools to determine whether the downloaded program 103 will underflow or overflow its stack, or whether the downloaded program 103 will violate files and other resources on the user's computer.

A second issue with regard to downloading computer software from one computer to another concerns transferring computer software between computer platforms which use distinct underlying machine instruction sets. There are some prior art examples of platform independent computer programs and platform independent computer programming languages. What the prior art lacks are reliable and automated software verification tools for enabling recipients of such software to verify the integrity of transferred platform independent computer software obtained from a network server or other source.

SUMMARY OF THE INVENTION

The present invention verifies the integrity of computer programs written in a bytecode language, commercialized as the JAVA bytecode language, which uses a restricted set of data type specific bytecodes. All the available source code bytecodes in the language either (A) are stack data consuming bytecodes that have associated data type restrictions as to the types of data that can be processed by each such bytecode, (B) do not utilize stack data but affect the stack by either adding data of known data type to the stack or by removing data from the stack without regard to data type, or (C) neither use stack data nor add data to the stack.

The present invention provides a verifier tool and method for identifying, prior to execution of a bytecode program, any instruction sequence that attempts to process data of the wrong type for such a bytecode or if the execution of any bytecode instructions in the specified program would cause underflow or overflow of the operand stack, and to prevent the use of such a program.

The bytecode program verifier of the present invention includes a virtual operand stack for temporarily storing stack information indicative of data stored in a program operand stack during the actual execution a specified bytecode program. The verifier processes the specified program using data flow analysis, processing each bytecode instruction of the program whose stack and register input status map is affected by another instruction processed by the verifier. A stack and register input status map is generated for every analyzed bytecode instruction, and when an instruction is a successor to multiple other instructions, its status map is generated by merging the status maps created during the processing of each of the predecessor instructions. The verifier also compares the stack and register status map information with data type restrictions associated with each bytecode instruction so as to determine if the operand stack or registers during program execution would contain data inconsistent with the data type restrictions of the bytecode instruction, and also determines if any bytecode instructions in the specified program would cause underflow or overflow of the operand stack.

The merger of stack and register status maps requires special handling for the instructions associated with exception handlers and the instructions associated with subroutine calls (including "finally" instruction blocks that are executed via a subroutine call whenever a protected code block is exited).

After pre-processing of the program by the verifier, if no program faults were found, a bytecode program interpreter executes the program without performing operand stack overflow and underflow checks and without performing data type checks on operands stored in operand stack. As a result, program execution speed is greatly improved.

BRIEF DESCRIPTION OF THE DRAWINGS

The accompanying drawings, which are incorporated in and form a part of this specification, illustrate embodiments of the invention and, together with the description, serve to explain the principles of the invention, wherein.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 1:
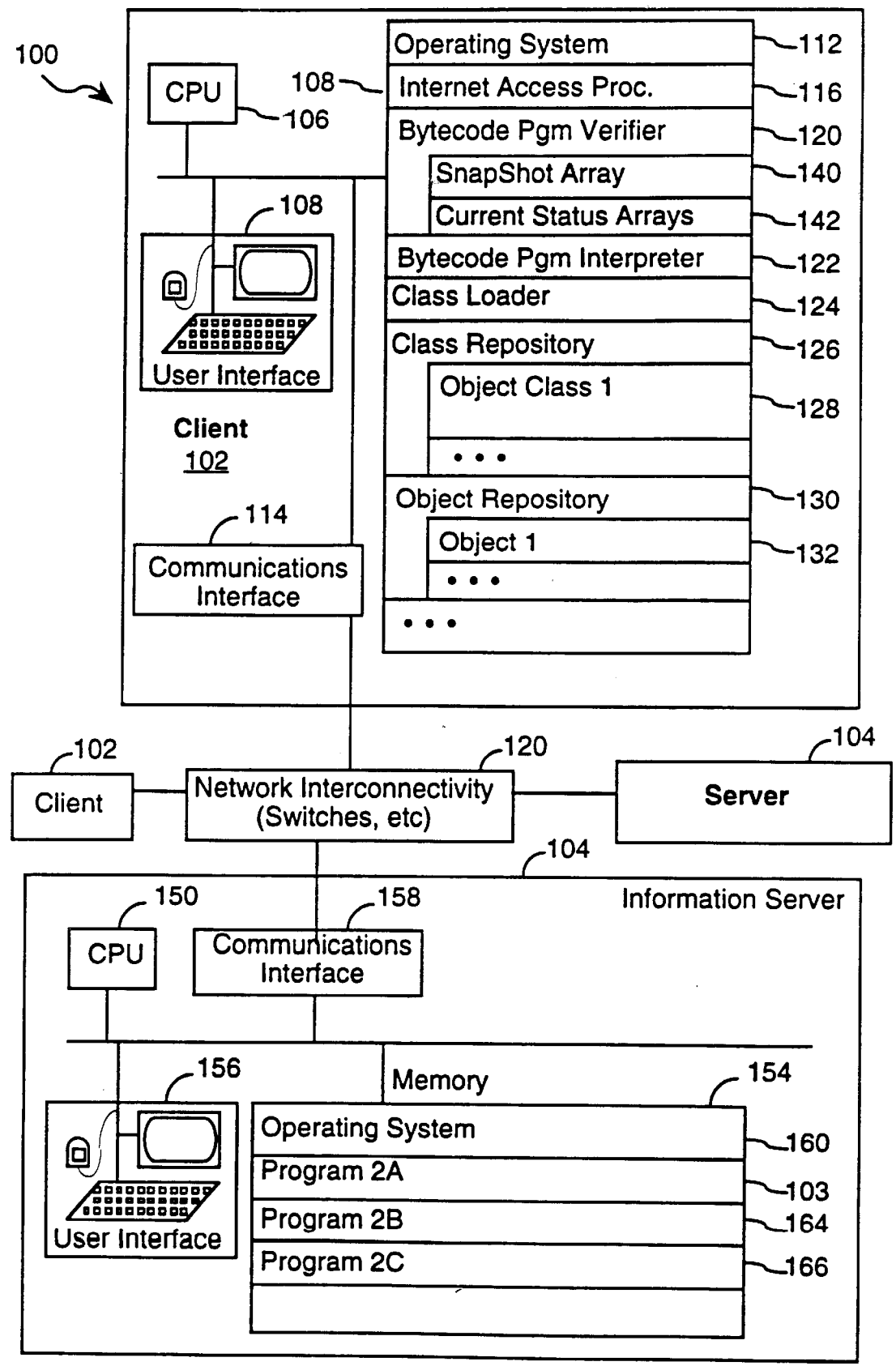
FIG. 1 is a block diagram of a computer system incorporating a preferred embodiment of the present invention.

Referring now to a distributed computer system 100 as shown in FIG. 1, there is shown a distributed computer system 100 having multiple client computers 102 and multiple server computers 104. In the preferred embodiment, each client computer 102 is connected to the servers 104 via the Internet 120, although other types of communication connections could be used. While most client computers are desktop computers, such as Sun workstations, IBM compatible computers and Macintosh computers, virtually any type of computer can be a client computer. In the preferred embodiment, each client computer includes a CPU 106, a user interface 108, memory 110, and a communications interface 114. Memory 110 stores:

- an operating system 112;
- an Internet communications manager program 116;
- a bytecode program verifier 120 for verifying whether or not a specified program satisfies certain predefined integrity criteria;
- a bytecode program interpreter 122 for executing application programs;
- a class loader 124, which loads object classes into a user's address space and utilizes the bytecode program verifier to verify the integrity of the methods associated with each loaded object class;
- at least one class repository 126, for locally storing object classes 128 in use and/or available for use by user's of the computer 102;
- at least one object repository 130 for storing objects 132, which are instances of objects of the object classes stored in the object repository 126.

In the preferred embodiment the operating system 112 is an object oriented multitasking operating system that supports multiple threads of execution within each defined address space.

The bytecode program verifier 120 includes a snapshot array 140, a status array 142, and other data structures that will be described in more detail below.

The class loader 124 is typically invoked when a user first initiates execution of a procedure, requiring that an object of the appropriate object class be generated. The class loader 124 loads in the appropriate object class and calls the bytecode program verifier 120 to verify the integrity of all the bytecode programs in the loaded object class. If all the methods are successfully verified an object instance of the object class is generated, and the bytecode interpreter 122 is invoked to execute the user requested procedure, which is typically called a method. If the procedure requested by the user is not a bytecode program and if execution of the non-bytecode program is allowed (which is outside the scope of the present document), the program is executed by a compiled program executer (not shown).

The class loader is also invoked whenever an executing bytecode program encounters a call to an object method for an object class that has not yet been loaded into the user's address space. Once again the class loader 124 loads in the appropriate object class and calls the bytecode program verifier 120 to verify the integrity of all the bytecode programs in the loaded object class. In many situations the object class will be loaded from a remotely located computer, such as one of the servers 104 shown in FIG. 1. If all the methods in the loaded object class are successfully verified, an object instance of the object class is generated, and the bytecode interpreter 122 is invoked to execute the called object method.

Figure 2:
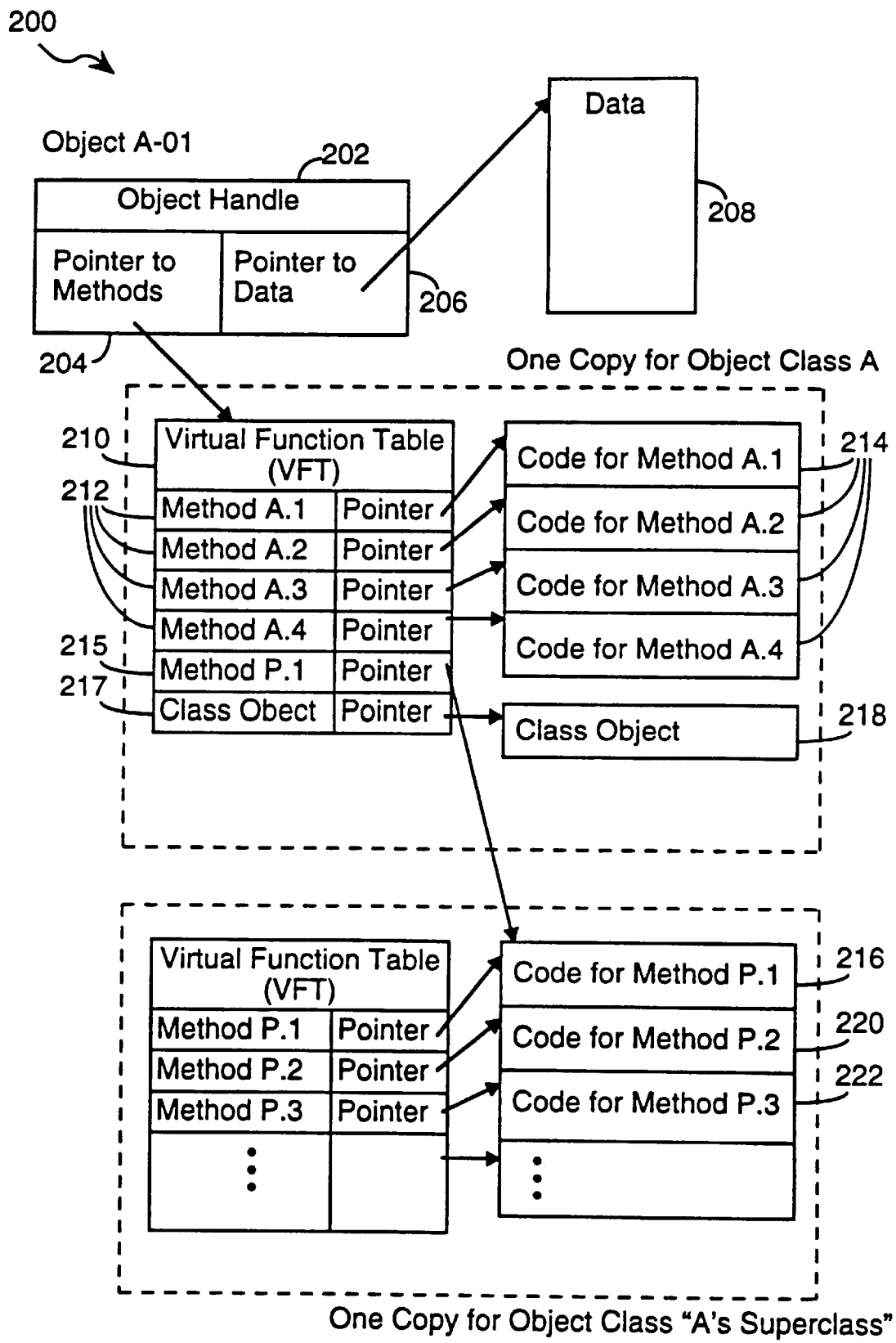
FIG. 2 is a block diagram of the data structure for an object in a preferred embodiment of the present invention.

FIG. 2 shows the data structure 200 in a preferred embodiment of the present invention for an object A-01 of class A. An object of object class A has an object handle 202 that includes a pointer 204 to the methods for the object and a pointer 206 to a data array 208 for the object.

The pointer 204 to the object's methods is actually an indirect pointer to the methods of the associated object class. More particularly, the method pointer 204 points to the Virtual Function Table (VFT) 210 for the object's object class. Each object class has a VFT 210 that includes (A) pointers 212 to each of the methods 214 of the object class, (B) one or more pointers 215 to methods 216 associated with superclasses of class A, and (C) a pointer 217 to a special Class Object 218.

Referring to FIGS. 1 and 2, in the preferred embodiment, the methods in an object class to be loaded are bytecode programs, which when interpreted will result in a series of executable instructions. A listing of all the source code bytecode instructions in the JAVA instruction set is provided in Table 1. The JAVA bytecode instruction set is characterized by bytecode instructions that are data type specific. Specifically, the JAVA instruction set distinguishes the same basic operation on different primitive data types by designating separate opcodes. Accordingly, a plurality of bytecodes are included within the instruction set to perform the same basic function (for example to add two numbers), with each such bytecode being used to process only data of a corresponding distinct data type. In addition, the JAVA instruction set is notable for instructions not included. For instance, there are no instructions in the JAVA bytecode language for converting numbers into object references. These restrictions on the JAVA bytecode instruction set help to ensure that any bytecode program which utilizes data in a manner consistent with the data type specific instructions in the JAVA instruction set will not violate the integrity of a users computer system.

In the preferred embodiment, the available data types are integer, long integer, single precision floating point, double precision floating point, handles (sometimes herein called objects or object references), and return addresses (pointers to virtual machine code). Additional data types are arrays of integers, arrays of long integers, arrays of single precision floating point numbers, arrays of double precision floating point numbers, arrays of handles, arrays of booleans, arrays of bytes (8-bit integers), arrays of short integers (16 bit signed integer), and arrays of unicode characters.

The "handle" data type includes a virtually unlimited number of data subtypes because each handle data type includes an object class specification as part of the data type. In addition, constants used in programs are also data typed, with the available constant data types in the preferred embodiment comprising the data types mentioned above, plus class, fieldref, methodref, string, and Asciz, all of which represent two or more bytes having a specific purpose.

The few bytecodes that are data type independent perform stack manipulation functions such as (A) duplicating one or more words on the stack and placing them at specific locations within the stack, thereby producing more stack items of known data type, or (B) clearing one or more items from the stack. A few other data type independent bytecodes do not utilize any words on the stack and leave the stack unchanged, or add words to the stack without utilizing any of the words previously on the stack. These bytecodes do not have any data type restrictions with regard to the stack contents prior to their execution, and all but a few modify the stack's contents and thus affect the program verification process.

The second computer node 104, assumed here to be configured as a file or other information server, includes a central processing unit 150, a user interface 156, memory 154, and a other communication interface 158 that connects the second computer node to the computer communication network 120. Memory 154 stores programs 103, 164, 166 for execution by the processor 150 and/or distribution to other computer nodes.

The first and second computer nodes 102 and 104 may utilize different computer platforms and operating systems 112, 160 such that object code programs executed on either one of the two computer nodes cannot be executed on the other. For instance, the server node 104 might be a Sun Microsystems computer using a Unix operating system while the user workstation node 102 may be an IBM compatible computer using an 80486 microprocessor and a Microsoft DOS operating system. Furthermore, other user workstations coupled to the same network and utilizing the same server 104 might use a variety of different computer platforms and a variety of operating systems.

In the past, a server 104 used for distributing software on a network having computers of many types would store distinct libraries of software for each of the distinct computer platform types (e.g., Unix, Windows, DOS, Macintosh, etc.). Thus, different versions of the same computer program might be stored in each of the libraries. However, using the present invention, many computer programs could be distributed by such a server using just a single, bytecode version of the program.

The bytecode verifier 120 is an executable program which verifies operand data type compatibility and proper stack manipulations in a specified bytecode (source) program 214 prior to the execution of the bytecode program by the processor 106 under the control of the bytecode interpreter 122. Each bytecode program has an associated verification status value that is True if the program's integrity is verified by the bytecode verifier 120, and it otherwise set to False.

During normal execution of programs using languages other than the Java bytecode language, the interpreter must continually monitor the operand stack for overflows (i.e., adding more data to the stack than the stack can store) and underflows (i.e., attempting to pop data off the stack when the stack is empty). Such stack monitoring must normally be performed for all instructions that change the stack's status (which includes most all instructions). For many programs, stack monitoring instructions executed by the interpreter account for approximately 80% of the execution time of an interpreted computed program.

For many purposes, particularly the integrity of downloaded computer programs, the Internet is a "hostile environment." A downloaded bytecode program may contain errors involving the data types of operands not matching the data type restrictions of the instructions using those operands, which may cause the program to be fail during execution. Even worse, a bytecode program might attempt to create object references (e.g., by loading a computed number into the operand stack and then attempting to use the computed number as an object handle) and to thereby breach the security and/or integrity of the user's computer.

Use of the bytecode verifier 120 in accordance with the present invention enables verification of a bytecode program's integrity and allows the use of an interpreter 122 which does not execute the usual stack monitoring instructions during program execution, thereby greatly accelerating the program interpretation process.

The Bytecode Program Verifier

Figure 3:
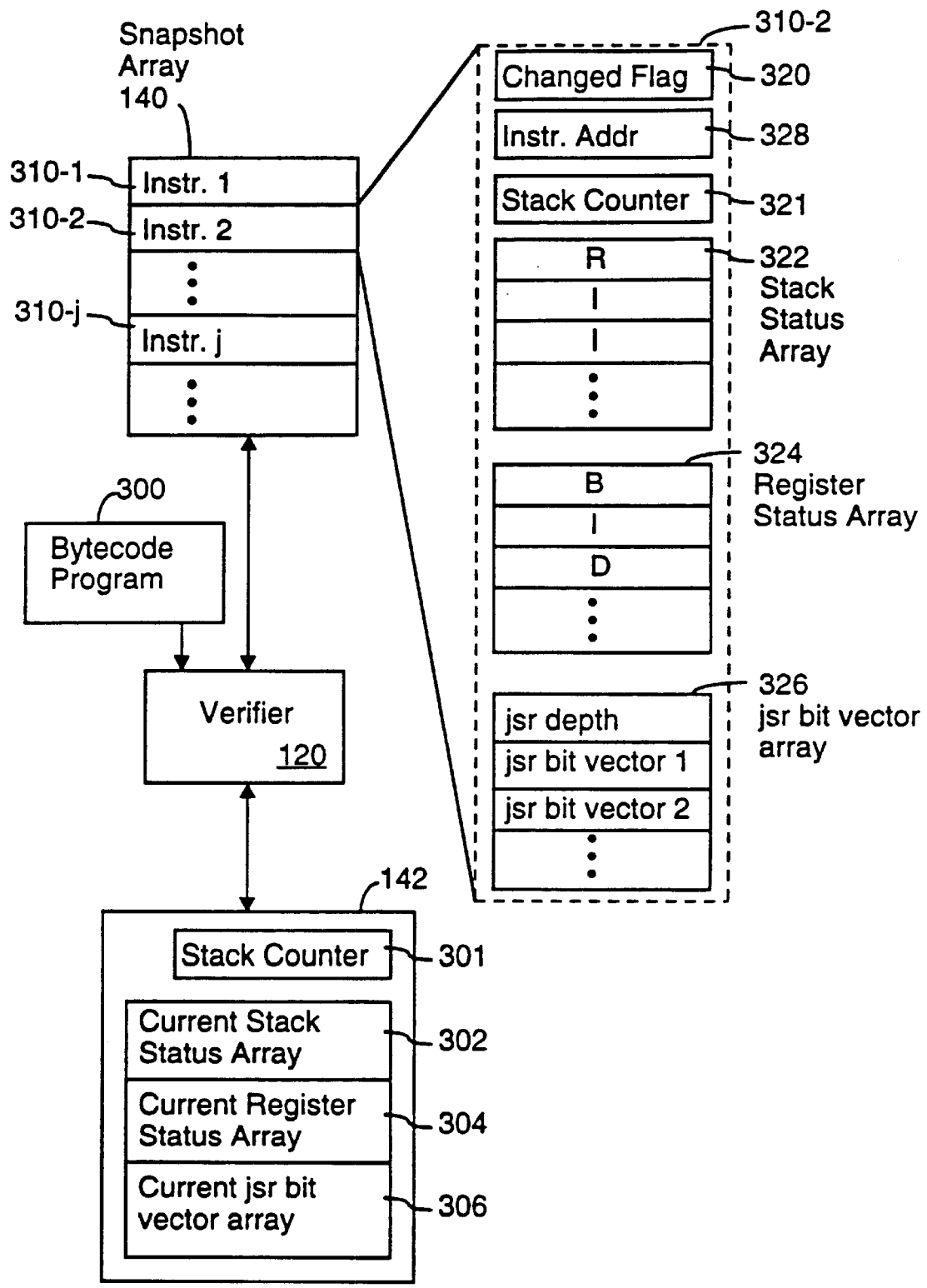
FIG. 3 is a block diagram of the data structures maintained by a bytecode verifier during verification of a bytecode program in accordance with the present invention.

Referring now to FIG. 3, the bytecode program verifier 120 (often called the "verifier") uses a few temporary data structures to store information it needs while verifying a specified bytecode program 300. In particular, the verifier 120 uses a set of data structures 142 for representing current stack and register status information, and a snapshot data structure 140 for representing the status of the virtual stack and registers just prior to the execution of each instruction in the program being verified. The current status data structures 142 include: a stack size indicator, herein called the stack counter 301, a virtual stack 302 that indicates the data types of all items in the virtual operand stack, a virtual register array 304 that indicates the data types of all items in the virtual registers, and a "jsr" bit vector array 306 that stores zero or more bit vectors associated with the zero or more subroutine calls required to reach the instruction currently being processed.

The stack counter 301, which indicates the number of stack elements that are currently in use (i.e., at the point in the method associated with the instruction currently being analyzed), is updated by the verifier 120 as it keeps track of the virtual stack manipulations so as to reflect the current number of virtual stack entries.

The virtual stack 302 stores data type information regarding each datum that will be stored by the bytecode program 300 in the virtual operand stack during actual execution of the program. In the preferred embodiment, the virtual stack 302 is used in the same way as a regular stack, except that instead of storing actual data and constants, the virtual stack 302 stores a data type indicator value for each datum that will be stored in the operand stack during actual execution of the program. Thus, for instance, if during actual execution the stack were to store three values:

HandleToObjectA
5
1 the corresponding virtual stack entries will be

R;Class A;initialized
I
I where "R" in the virtual stack indicates an object reference, "Class A" indicates that class or type of the referenced object is "A", "initialized" indicates that the referenced object is an initialized object, and each "I" in the virtual stack indicates an integer. Furthermore, the stack counter 301 in this example would store a value of 3, corresponding to three values being stored in the virtual stack 302.

Data of each possible data type is assigned a corresponding virtual stack marker value, for instance: integer (I), long integer (L), single precision floating point number (F), double precision floating point number (D), byte (B), short (S), and object reference (R). The marker value for an object reference includes a value (e.g., "Class A") indicating the object type and a flag indicating if the object has been initialized. If this is an object that has been created by the current method, but has not yet been initialized, the marker value for the object reference also indicates the program location of the instruction that created the object instance being referenced.

The virtual register array 304 serves the same basic function as the virtual stack 302. That is, it is used to store data type information for registers used by the specified bytecode program. Since data is often transferred by programs between registers and the operand stack, the bytecode instructions performing such data transfers and otherwise using registers can be checked to ensure that the data values in the registers accessed by each bytecode instruction are consistent with the data type usage restrictions on those bytecode instructions.

The structure and use of the jsr bit vector array 306 will be described below in the discussion of the handling of subroutine jumps and returns.

While processing the specified bytecode program, for each datum that would be popped off the stack for processing by a bytecode instruction, the verifier pops off the same number of data type values off the virtual stack 302 and compares the data type values with the data type requirements of the bytecode. For each datum that would be pushed onto the stack by a bytecode instruction, the verifier pushes onto the virtual stack a corresponding data type value.

One aspect of program verification in accordance with present invention is verification that the number of the operands in the virtual stack 302 is identical every time a particular instruction is executed, and that the data types of operands in the virtual stack are compatible. If a particular bytecode instruction can be immediately preceded in execution by two or more different instructions, then the status of the virtual stack immediately after processing of each of those different predecessor instructions must be compared. Usually, at least one of the different preceding instructions will be a conditional or unconditional jump or branch instruction. A corollary of the above "stack consistency" requirement is that each program loop must not result in a net addition or reduction in the number of operands stored in the operand stack.

The stack snapshot array 140 is used to store "snapshots" of the stack counter 301, virtual stack 302, virtual register array 304 and jsr bit vector array 306. A separate snapshot 310 is stored for every instruction in the bytecode program. Each stored stack snapshot includes a "changed" flag 320, a stack counter 321, a stack status array 322, a register status array 324 and a variable length jsr bit vector array 326. The jsr bit vector array 326 is empty except for instructions that can only be reached via one or more jsr instructions.

The changed flag 320 is used to determine which instructions require further processing by the verifier, as will be explained below. The stack counter 321, stack status array 322, register status array 324, and jsr bit vector array 326 are based on the values stored in the data structures 301, 302, 304 and 306 at corresponding points in the verification process.

The snapshot storage structure 140 furthermore stores instruction addresses 328 (e.g., the absolute or relative address of each target instruction). Instruction addresses 328 are used by the verifier to make sure that no jump or branch instruction has a target that falls in the middle of a bytecode instruction.

As was described previously, the bytecode program 300 includes a plurality of data type specific instructions, each of which is evaluated by the verifier 120 of the present invention.

Referring now to FIGS. 4A–4F, and Table 2, the execution of the bytecode verifier program 120 will be described in detail. Table 2 lists a pseudocode representation of the verifier program. The pseudocode used in Table 2 utilizes universal computer language conventions. While the pseudocode employed here has been invented solely for the purposes of this description, it is designed to be easily understandable by any computer programmer skilled in the art.

Figure 4A:
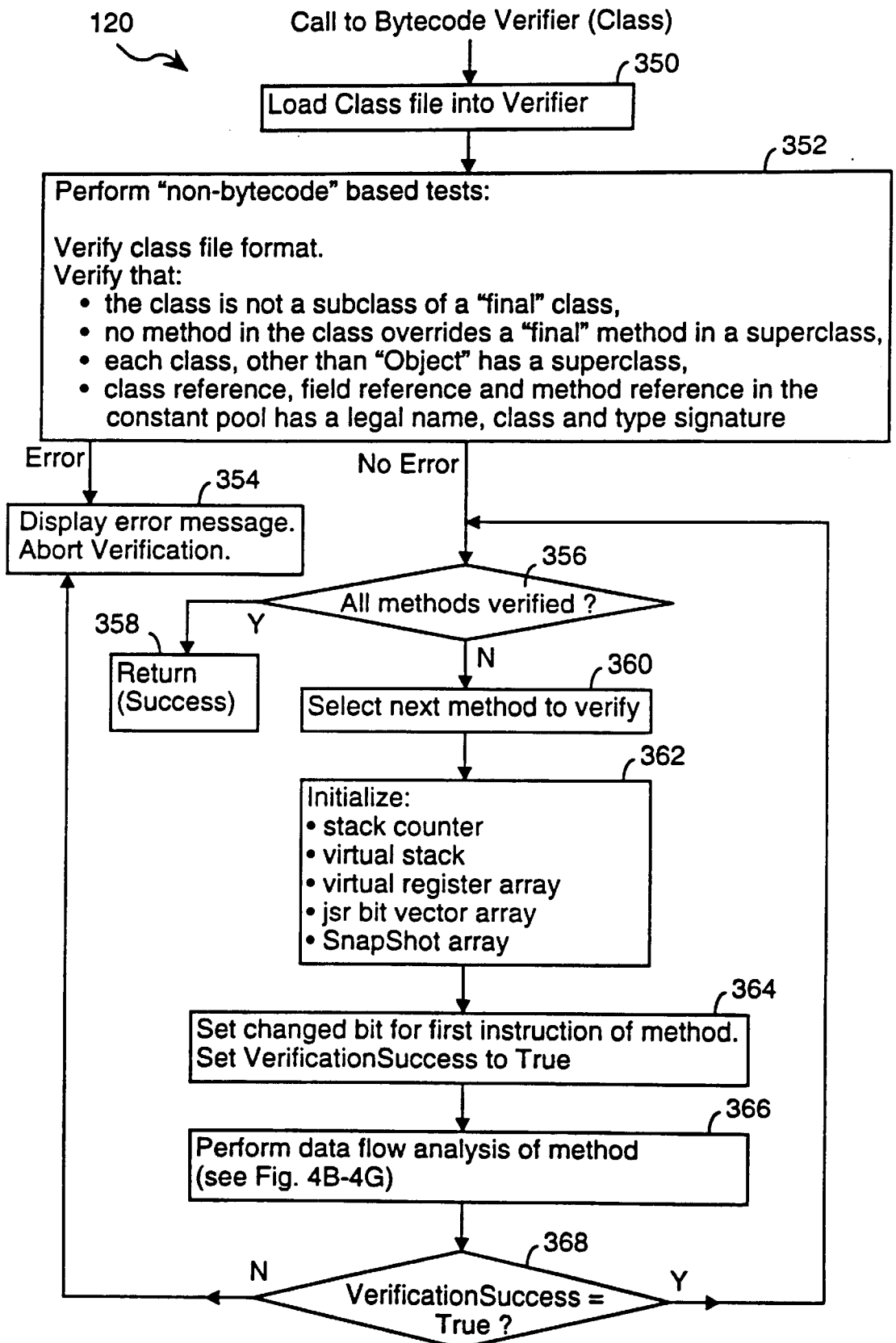
FIGS. 4A–4G represents flow charts of the bytecode program verification process in the preferred embodiment of the present invention.

As shown in FIG. 4A, a selected class file containing one or more bytecode methods is loaded (350) into the bytecode verifier 120 for processing. The verifier first performs a number of "non-bytecode" based tests (352) on the loaded class, including verifying:

the class file's format;
that the class is not a subclass of a "final" class;
that no method in the class overrides a "final" method in a superclass;
that each class, other than "Object," has a superclass; and
that each class reference, field reference and method reference in the constant pool has a legal name, class and type signature If any of these initial verification tests fail, an appropriate error message is displayed or printed, and the verification procedure exits with an abort return code (354).

Next, the verification procedure checks to see if all bytecode methods have been verified (356). If so, the procedure exits with a success return code (358). Otherwise, it selects a next bytecode method in the loaded object class file that requires verification (360).

The code for each method includes the following information:

the maximum stack space needed by the method;
the maximum number of registers used by the method;
the actual bytecodes for executing the method;
a table of exception handlers.

Each entry in the exception handlers tables gives a start and end offset into the bytecodes, an exception type, and the offset of a handler for the exception. The entry indicates that if an exception of the indicated type occurs within the code indicated by the starting and ending offsets, a handler for the exception will be found at the given handler offset.

After selecting a method to verify, the verifier initializes a number of data structures (362), including the stack counter 301, virtual stack 302, virtual register array 304, jsr bit vector array 306, and the snapshot array 140. The snapshot array is initialized as follows. The snapshot for the first instruction of the method is initialized to indicate that the stack is empty and the registers are empty except for data types indicated by the method's type signature, which indicates the initial contents of the registers. The snapshots for all other instructions are initialized to indicate that the instruction has not yet been visited.

In addition, the "changed" bit for the first instruction of the program is set, and a flag called VerificationSuccess is set to True (364). If the VerificationSuccess flag is still set to True when the verification procedure is finished (368), that indicates that the integrity of the method has been verified. If the VerificationSuccess flag is set to False when the verification procedure is finished, the method's integrity has not been verified, and therefore an error message is displayed or printed, and the verification procedure exits with an abort return code (354).

After these initial steps, a data flow analysis is performed on the selected method (366). The details of the data flow analysis, which forms the main part of the verification procedure, is discussed below with reference to FIG. 4B.

In summary, the verification procedure processes each method of the loaded class file until either all the bytecode methods are successfully verified, or the verification of any one of the methods fails.

Data Flow Analysis of Method

Figure 4B:
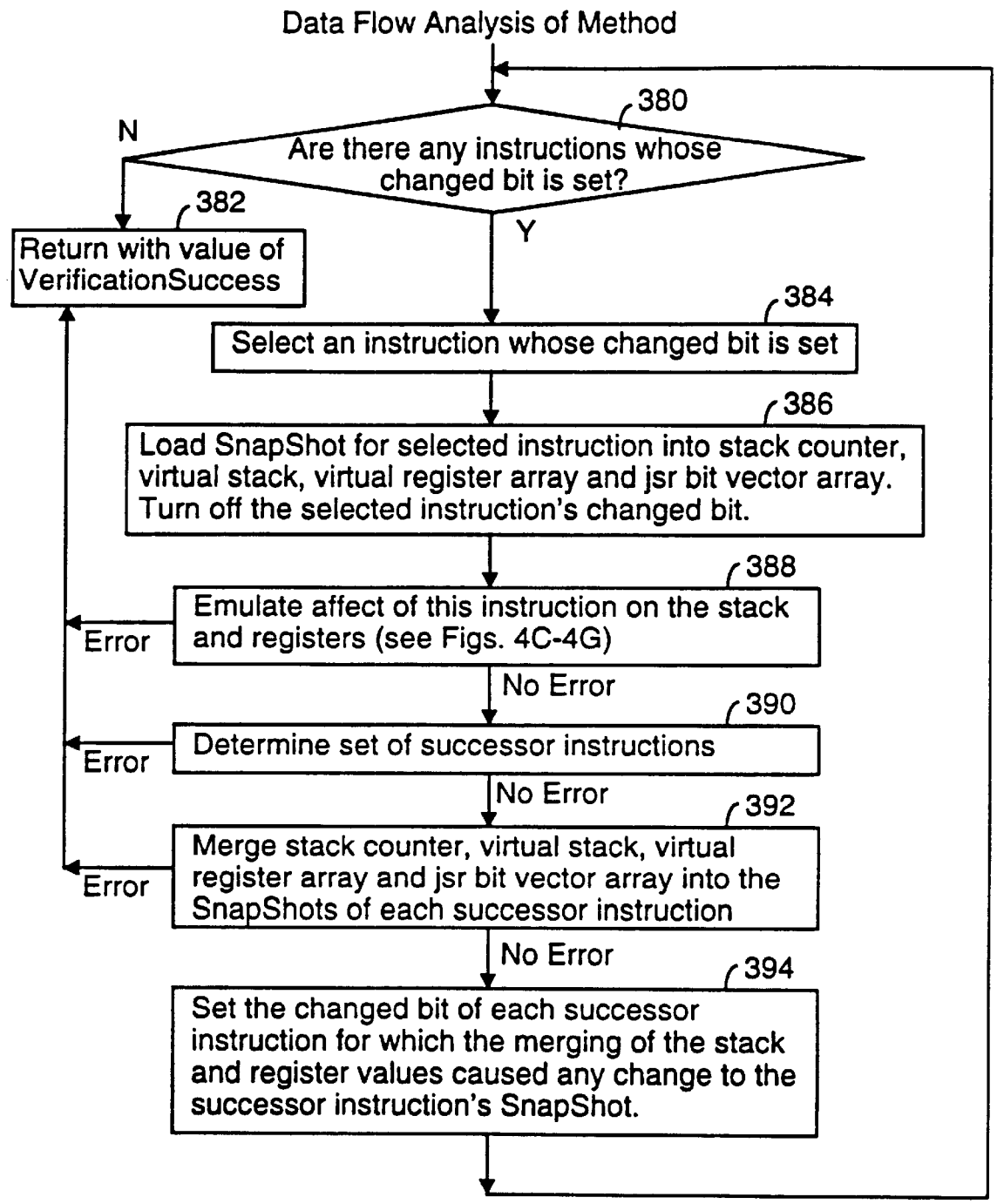

Referring to FIG. 4B and the corresponding portion of Table 2, the data flow analysis of the selected method is completed (382) when there are no instructions whose changed bit is set (380). Detection of any stack or register usage error during the analysis causes the VerificationSuccess flag to set to False and for the analysis to be stopped (382).

If there is at least one instruction whose changed bit is set (380), the procedure selects a next instruction whose changed bit is set (384). Any instruction whose changed bit is set can be selected.

The analysis of the selected instruction begins with the pre-existing snapshot for the selected instruction being loaded into the stack counter, virtual stack and the virtual register array, and jsr bit vector array, respectively (386). In addition, the changed bit for the selected instruction is turned off (386).

Next, the effect of the selected instruction on the stack and registers is emulated (388). More particularly, four types of "actions" performed by bytecode instructions are emulated and checked for integrity: stack pops, stack pushes, reading data from registers and writing data to registers. The detailed steps of this emulation process are described next with reference to FIGS. 4C–4G.

Figure 4C:
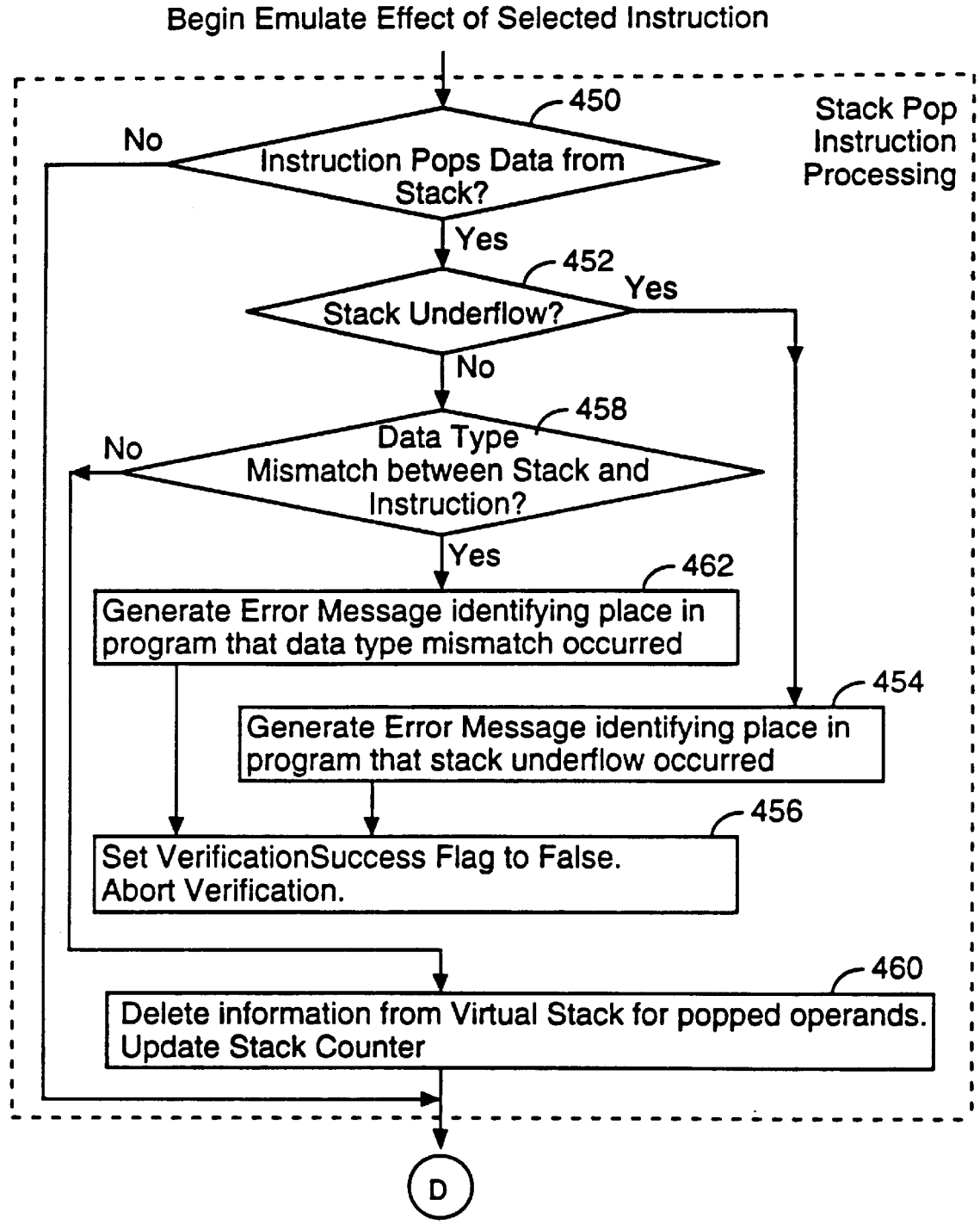

Referring to FIG. 4C, if the selected instruction pops data from the stack (450), the stack counter 301 is inspected (452) to determine whether there is sufficient data in the stack to satisfy the data pop requirements of the instruction. If the operand stack has insufficient data (452) for the current instruction, that is called a stack underflow, in which case an error signal or message is generated (454) identifying the place in the program that the stack underflow was detected. In addition, the verifier will then set a VerificationSuccess flag to False and abort (456) the verification process.

If no stack underflow condition is detected, the verifier will compare (458) the data type code information previously stored in the virtual stack with the data type requirements (if any) of the currently selected instruction. For example, if the opcode of the instruction being analyzed calls for an integer add of a value popped from the stack, the verifier will compare the operand information of the item in the virtual stack which is being popped to make sure that is of the proper data type, namely integer. If the comparison results in a match, then the verifier deletes (460) the information from the virtual stack associated with the entry being popped and updates the stack counter 301 to reflect the number of entries popped from the virtual stack 302.

If a mismatch is detected (458) between the stored operand information in the popped entry of the virtual stack 302 and the data type requirements of the currently selected instruction, then a message is generated (462) identifying the place in the bytecode program where the mismatch occurred. The verifier will then set the VerificationSuccess flag to False and abort (456) the verification process. This completes the stack pop verification process.

Figure 4D:
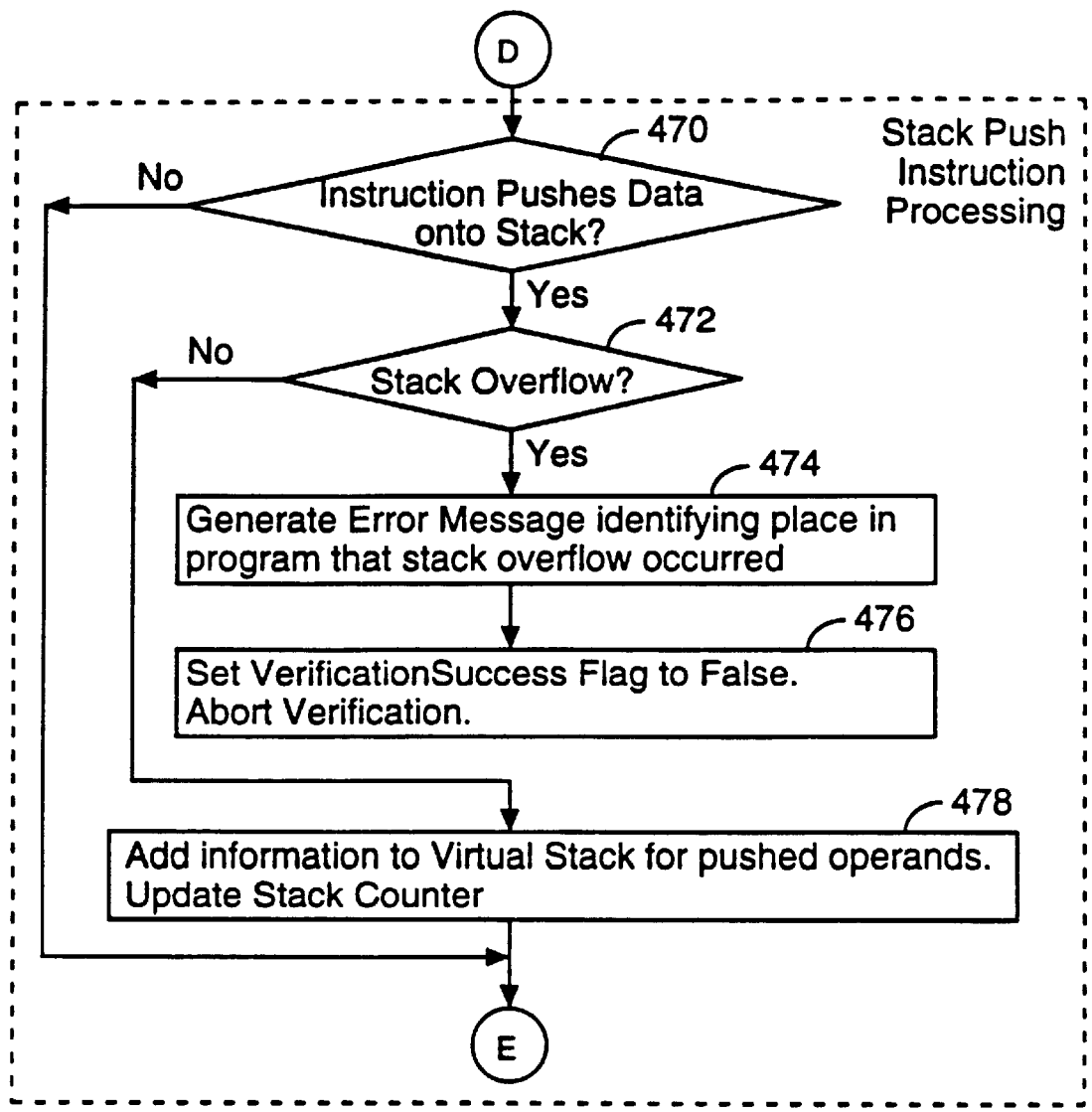

Referring to FIG. 4D, if the currently selected instruction pushes data onto the stack (470), the stack counter is inspected (472) to determine whether there is sufficient room in the stack to store the data the selected instruction will push onto the stack. If the operand stack has insufficient room to store the data to be pushed onto the stack by the current instruction (472), that is called a stack overflow, in which case an error signal or message is generated (474) identifying the place in the program that the stack underflow was detected. In addition, the verifier will then set the VerificationSuccess flag to False and abort (476) the verification process.

If no stack overflow condition is detected, the verifier will add (478) an entry to the virtual stack indicating the type of data (operand) which is to be pushed onto the operand stack (during the actual execution of the program) for each datum to be pushed onto the stack by the currently selected instruction. This information is derived from the data type specific opcodes utilized in the bytecode program of the preferred embodiment of the present invention, the prior contents of the stack and the prior contents of the registers. The verifier also updates the stack counter 301 to reflect the added entry or entries in the virtual stack 302. This completes the stack push verification process.

Figure 4E:
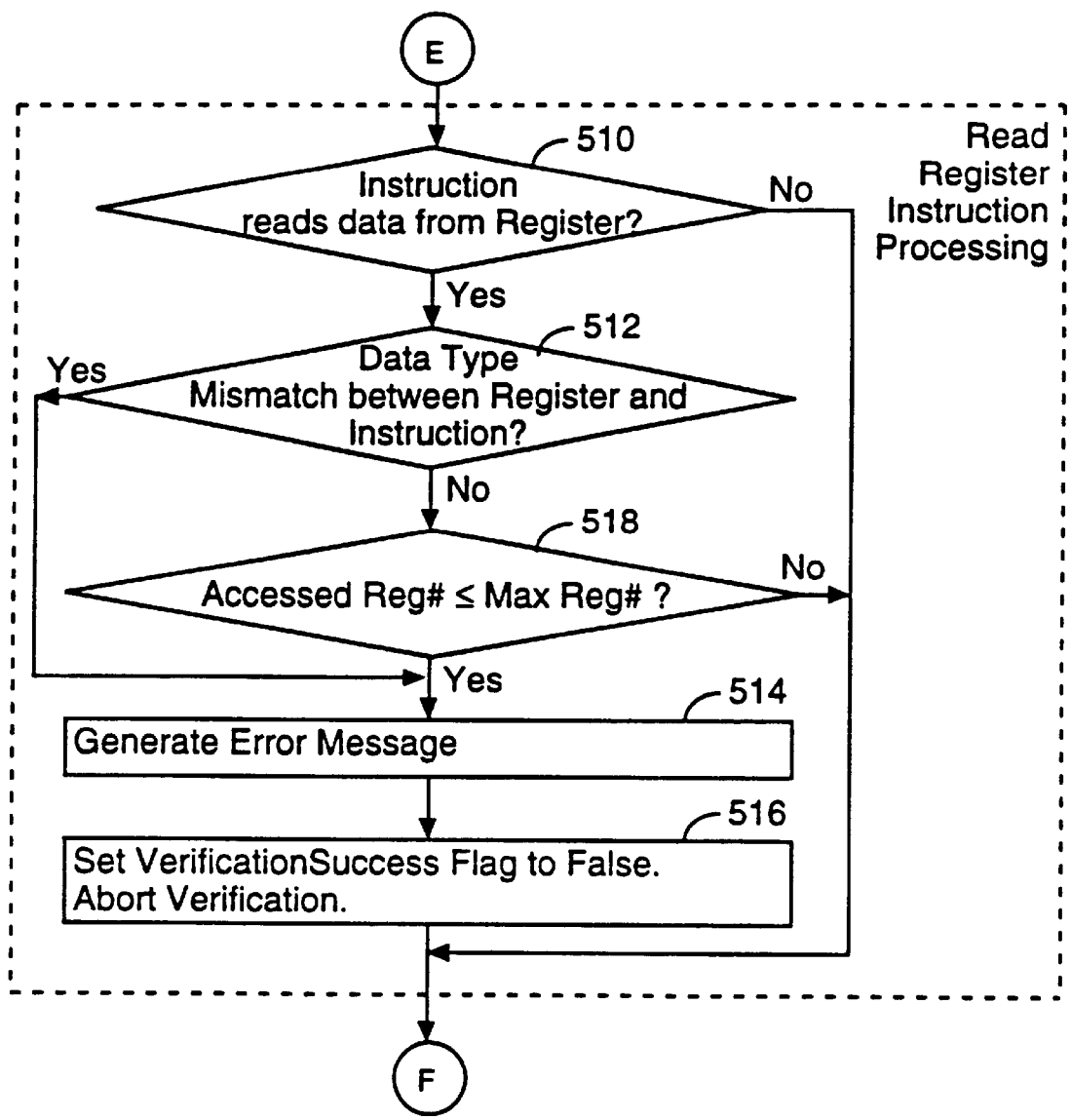

Referring to FIG. 4E, if the currently selected instruction reads data from a register (510), the verifier will compare (512) the data type code information previously stored in the corresponding virtual register with the data type requirements (if any) of the currently selected instruction . For object handles, data type checking takes into account object class inheritance (i.e., a method that operates on an object of a specified class will can also operate on an object of any subclass of the specified class). If a mismatch is detected (512) between the data type information stored in the virtual register and the data type requirements of the currently selected instruction, then a message is generated (514) identifying t he place in the bytecode program where the mismatch occurred. The verifier will then set the VerificationSuccess flag to False and abort (516) the verification process.

The verifier also checks to see if the register accessed by the currently selected instruction has a register number higher than the maximum register number for the method being verified (518). If so, a message is generated (514) identifying the place in the bytecode program where the register access error occurred. The verifier will then set the VerificationSuccess flag to False and abort (516) the verification process.

If the currently selected instruction does not read data from a register (510) or the data type comparison at step 512 results in a match and the registered accessed is within the range of register numbers used by the method being verified (518), then the verifier continues processing the currently selected instruction at step 520.

Figure 4F:
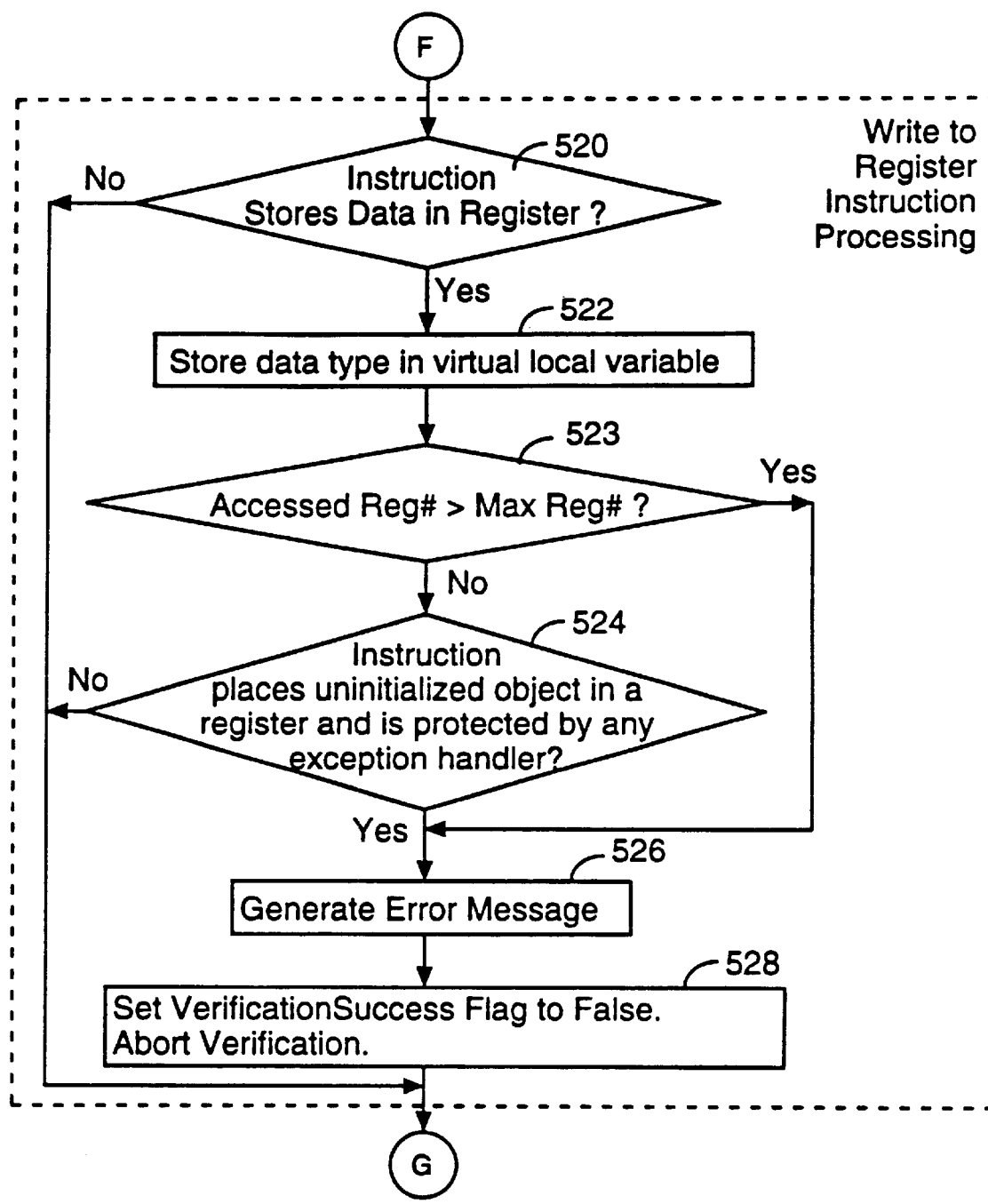
Figure 4G:
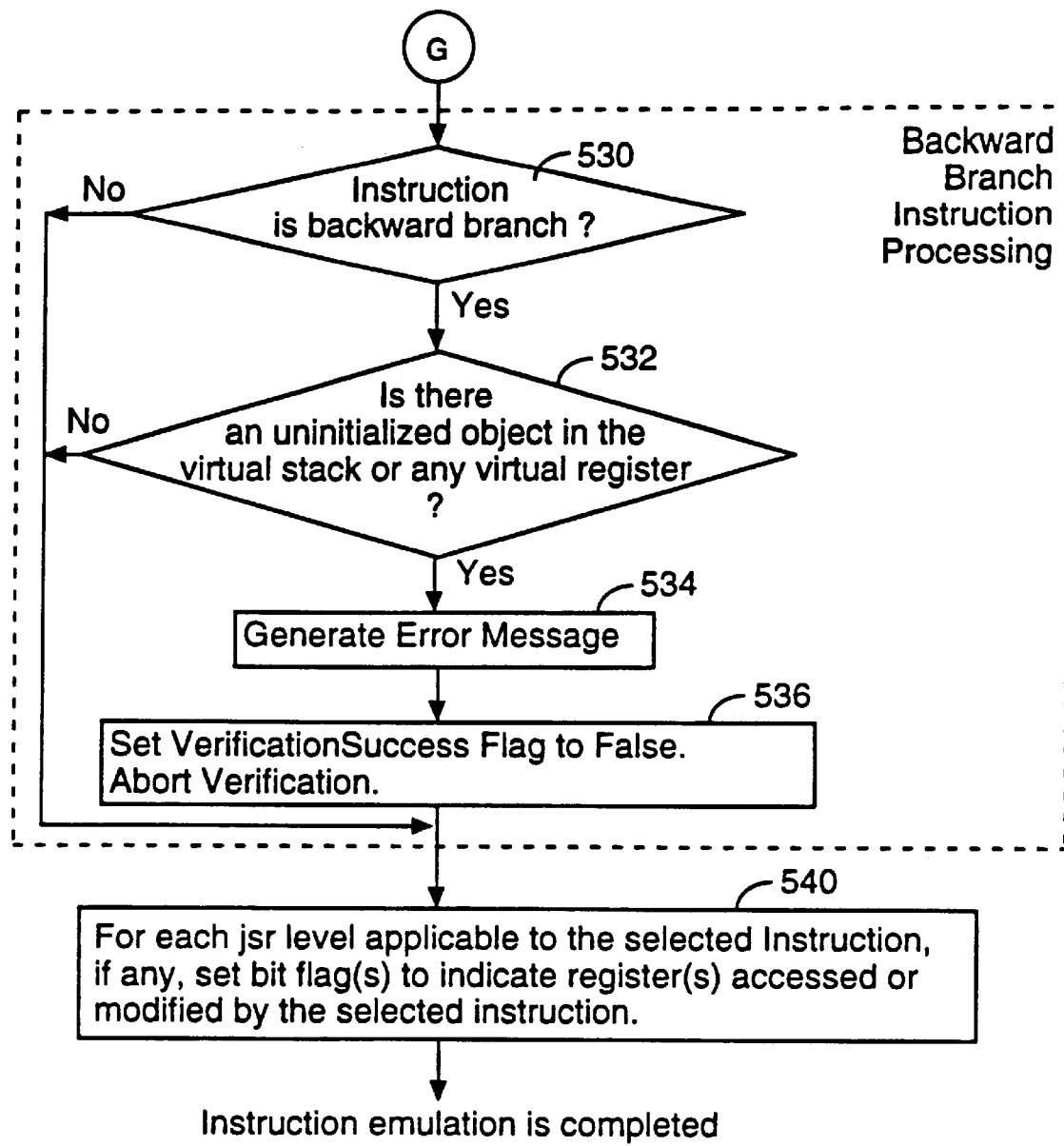

Referring to FIG. 4F, if the currently selected instruction stores data into a register (520), then the data type associated with the selected bytecode instruction is stored in the virtual register (522).

The verifier also checks to see if the register(s) to be written by the currently selected instruction has(have) a register number higher than the maximum register number for the method being verified (523). If so, an error message is generated (526) identifying the place in the bytecode program where the register access error occurred. The verifier will then set the VerificationSuccess flag to False and abort (528) the verification process.

In addition, the instruction emulation procedure updates the jsr bit vector array 306 as follows. The jsr bit vector array 306 includes a separate bit vector for each subroutine level. Thus, if the current instruction is in a subroutine nested four levels deep, there will be four active jsr bit vectors in the array 306. If the current instruction is in a subroutine that is the target of a jsr instruction (i.e., a jump to subroutine instruction), for each subroutine level applicable to the current instruction, the corresponding jsr bit vector is updated to indicate the register(s) accessed or modified by the current instruction (540, FIG. 4G). The set of "marked" registers in each jsr bit vector can only be increased, not decreased, by step 540.

At this point the procedure for emulating one instruction is complete.

Referring back now to FIG. 4B, if the instruction emulation resulted in the detection of an error, the verification process is halted (382). Otherwise, the next step (390) is to determine the selected instruction's set of successor instructions. The "successor instructions" are defined to be all instructions that might be executed next after the currently selected instruction. The set of all successor instructions, includes:

(A) the next instruction in the method, if the current instruction is not an unconditional goto, a return, or a throw;

(B) the target of a conditional or unconditional branch;

(C) all exception handlers for this instruction; and (D) when the current instruction is a subroutine return instruction, the instructions immediately following all jsr's that target the called subroutine.

It is noted that the last instruction of most exception handlers is a "goto" instruction. More generally, the successor instruction for the end of an exception handler is simply the successor instruction for the last instruction of the exception handler.

As part of the successor instruction determination process, the verifier also checks to see if the program can simply fall off the current instruction (i.e., without having a legal next instruction. If so, this is a fatal error and the VerificationSuccess flag is set to False and the verification procedure is terminated (382).

SnapShot Merger

After the successor instruction determination step (390), the verifier next merges the current stack counter 301, virtual stack 302, virtual register array 304 and jsr bit vector arrays 304 into the SnapShots of each of the successor instructions (392). This merger is performed separately for each successor instruction. There are a number of "special" cases requiring special handling of the status and snapshot merger process.

For instance, if a successor instruction is an exception handler, the Stack Status portion of the SnapShot of the successor instruction is defined to contain a single object of the exception type indicated by the exception handler information (i.e, the stored data type for the first virtual stack element indicates the object type of the exception handler), and furthermore the stack counter of the SnapShot of the successor instruction is set to a value of 1.

If the SnapShot for a successor instruction indicates that it has never before been "visited" (i.e., it is empty), the stack counter 301, virtual stack 302, virtual register array 304 and jsr bit vector array 306 are copied into the SnapShot for the successor instruction.

Otherwise, when the instruction has been visited before, the snapshot merger is handled as follows. If the stack counter in the Status Array does not match the stack counter in the existing SnapShot, or the two stacks are not identical with regard to data types, except for differently typed object handles, the VerificationSuccess flag is set to False and the verification process is aborted. Otherwise, the virtual stack 302 and virtual register array 304 values are merged into the values of the successor instruction's existing SnapShot as follows.

If two corresponding virtual stack elements or two corresponding virtual register elements contain different object handles, the specified data type for the stack or register element in the snapshot is replaced with the closest common ancestor (i.e., superclass) of the two handle types. If two corresponding virtual register elements contain different data types (other than handles), the data type for the register element in the updated SnapShot is denoted as "unknown" (i.e., unusable). If two corresponding stack elements contain different data types (other than handles), that is flagged by the verifier as an error.

However, if the successor instruction is the instruction immediately after a "jsr" instruction and the current instruction is a "ret" instruction the above rules for merging virtual register status information are replaced with the following rule:

1) for any register that the corresponding jsr bit vector (i.e., the jsr bit vector for the current instruction that corresponds to the successor jsr instruction) indicates that the subroutine has accessed or modified, update the successor instruction's virtual register SnapShot data to use the data type of the virtual register at the time of the return (i.e., use the virtual register data type information in the corresponding element of the virtual register array 304);

2) for all other registers, update the successor instruction's virtual register SnapShot data to use the data type of the register at the time of the preceding jsr instruction (i.e., copy the virtual register data type information from the corresponding element of the virtual register array in the preceding jsr's instruction's SnapShot).

The snapshot merger procedure also copies the current jsr bit vectors 306 into the SnapShot of the successor instructions only to the extent that those successor instructions are inside the same subroutines as the current instruction.

Finally, after the merger of the current verification status information into the SnapShot of each successor instruction has been performed, the changed bit for the successor instruction is set only if the merging of the virtual stack and register verification status values caused any change to the successor instruction's SnapShot (394).

Thus, the analysis of each selected instruction can cause the changed bit of one or more other instructions to be set. The data flow analysis continues until there are no instructions whose changed bit is set (380). Due to the fact that some instructions are the successor instructions for multiple other instructions, many instructions may be analyzed two or more times by the data flow analysis procedure before the data flow analysis of the method is completed.

Verification Considerations For Exception Handlers

An exception handler is a routine that protects a specified set of program code, called a protected code block. The exception handler is executed whenever the applicable exception gets thrown during execution of the corresponding protected code.

As indicated above, the Stack Status portion of the SnapShot for the first instruction of the exception handler contains a single object of the exception type indicated by the exception handler information (i.e, the stored data type for the first virtual stack element indicates the object type of the exception handler), and further more the stack counter of the SnapShot of the instruction is set to a value of 1.

The virtual register information of the SnapShot for the exception handler's first instruction contains data type values only for registers whose use is consistent throughout the protected code, and contains "unknown" indicators for all other registers used by the protected code.

Verification Considerations for "Finally" Code Blocks

The following program:
```
try {
   startFaucet( );
   waterLawn( );
} finally {
   stopFaucet( )
}
```
ensures that the faucet is turned off, even if an exception occurs while starting the faucet or watering the lawn. The code inside the bracket after the word "try" is called the protected code. The code inside the brackets after the word "finally" is called the cleanup code. The cleanup code is guaranteed to be executed, even if the protected code does a "return" out of the function, or contains a break or continue to code outside the try/finally code, or experiences an exception.

In the Java bytecode language, the "finally" construct is implemented using the exception handling facilities, together with a "jsr" (jump to subroutine) instruction and "ret" (return from subroutine) instruction. The cleanup code is implemented as a subroutine. When it is called, the top item on the stack will be the return address; this return address is saved in a register. A "ret" is placed at the end of the cleanup code to return to whatever code called the cleanup.

To implement the "finally" feature, a special exception handler is set up for the protected code which catches all exceptions. This exception handler: (1) saves any exception that occurs in a register, (2) executes a "jsr" to the cleanup code, and (3) upon return from the cleanup code, re-throws the exception.

If the protected code has a "return" instruction that when executed will cause a jump to code outside the protected code, the interpreter performs the following steps to execute that instruction: (1) it saves the return value (if any) in a register, (2) executes a "jsr" to the cleanup code, and (3) upon return from the cleanup code, returns the value saved in the register.

Breaks or continue instructions inside the protected code that go outside the protected code are compiled into bytecodes that include a "jsr" to the cleanup code before performing the associated "goto" function. In addition, there must be a "jsr" instruction at the end of the protected code.

The jsr bit vector array and corresponding SnapShot data, as discussed above, enable the successful verification of bytecode programs that contain "finally" constructs. Due to the provision of multiple jsr bit vectors, even multiply-nested cleanup code can be verified.

Verification Considerations for New Object Formation and Initialization

Creating a usable object in the bytecode interpreter is a multi-step process. A typical bytecode sequence for creating and initializing an object, and leaving it on top of the stack is:

```
new <myClass>         /*   allocate uninitialized space   /*
dup                   /*   duplicate object on the stack */
<instructions for pushing arguments onto the stack>
invoke myClass.<init> /*   initialize   /*
```

The myClass initialization method, myClass.<init>, sees the newly initialized object as its argument in register 0. It must either call an alternative myClass initialization method or call the initialization method of a superclass of the object before it is allowed to do anything else with the object.

To prevent the use of uninitialized objects, and to prevent objects from being initialized more than once, the bytecode verifier pushes a special data type on the stack as the result of the opcode "new":

R;ObjClass;uninitialized;creationstep

The instruction number (denoted above as "creationstep") needs to be stored as part of the special data type since there may be multiple instances of a not-yet initialized data type in existence at one time.

This special data type indicates the instruction in which the object was created and the class type of the uninitialized object created. When an initialization method is called on that object, all occurrences of the special type on the virtual stack and in the virtual registers (i.e., all virtual stack and virtual registers that have the identical data type, including the identical object creation instruction) are replaced by the appropriate, initialized data type:

R;ObjClass;initialized

During verification, the special data type for uninitialized objects is an illegal data type for any bytecode instruction to use, except for a call to an object initialization method for the appropriate object class. Thus, the verifier ensures that an uninitialized object cannot be used until it is initialized.

Similarly, the initialized object data type is an illegal data type for a call to an object initialization method. In this way the verifier ensures that an object is not initialized more than once.

One special check that the verifier must perform during the data flow analysis is that for every backwards branch, the verifier checks that there are no uninitialized objects on the stack or in a register. See steps 530, 532, 534, 536 in FIG. 4F. In addition, there may not be any uninitialized objects in a register in code protected by an exception handler or a finally code block. See steps 524, 526, 528 in FIG. 4F. Otherwise, a devious piece of code could fool the verifier into thinking it had initialized an object when it had, in fact, initialized an object created in a previous pass through the loop. For example, an exception handler could be used to indirectly perform a backwards branch.

Class Loader and Bytecode Interpreter

Figure 5:
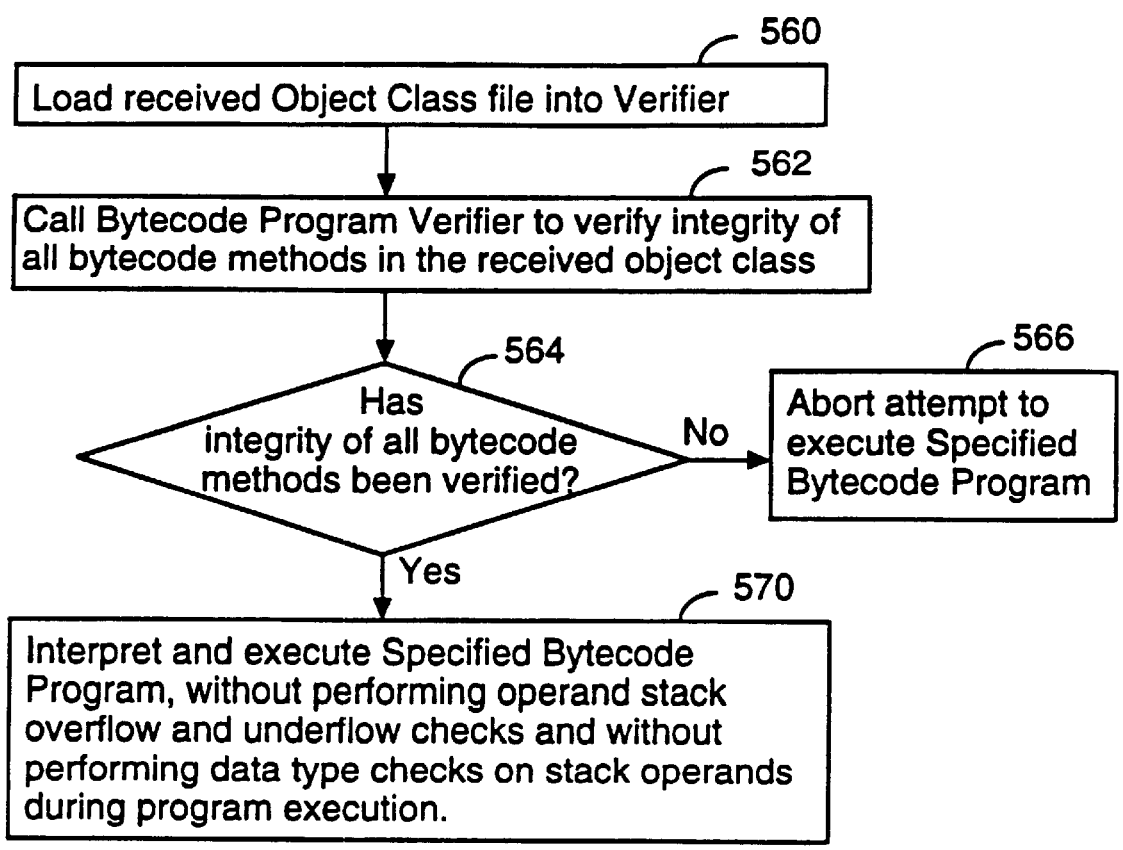
FIG. 5 represents a flow chart of the class loader and bytecode program interpreter process in the preferred embodiment of the present invention.

Referring to flow chart in FIG. 5 and Table 3, the execution of the class loader 124 and bytecode interpreter 122 will be described. Table 3 lists a pseudocode representation of the class loader and bytecode interpreter.

The class loader 124 is typically invoked when a user first initiates execution of a procedure, requiring that an object of the appropriate object class be generated. The class loader 124 loads in the appropriate object class file (560) and calls the bytecode program verifier 120 to verify the integrity of all the bytecode programs in the loaded object class (562). If the verifier returns a "verification failure" value (564), the attempt to execute the specified bytecode program is aborted by the class loader (566).

If all the methods are successfully verified (564) an object instance of the object class is generated, and the bytecode interpreter 122 is invoked (570) to execute the user requested procedure, which is typically called a method. The bytecode interpreter of the present invention does not perform (and does not need to perform) any operand stack overflow and underflow checking during program execution and also does not perform any data type checking for data stored in the operand stack during program execution. These conventional stack overflow, underflow and data type checking operations can be skipped by the present invention because the verifier has already verified that errors of these types will not be encountered during program execution.

The program interpreter of the present invention is especially efficient for execution of bytecode programs having instruction loops that are executed many times, because the operand stack checking instructions are executed only once for each bytecode in each such instruction loop in the present invention. In contrast, during execution of a program by a conventional interpreter, the interpreter must continually monitor the operand stack for overflows (i.e., adding more data to the stack than the stack can store) and underflows (i.e., attempting to pop data off the stack when the stack is empty). Such stack monitoring must normally be performed for all instructions that change the stack's status (which includes most all instructions). For many programs, stack monitoring instructions executed by the interpreter account for approximately 80% of the execution time of an interpreted computed program. As a result, the interpreter of the present invention will often execute programs at two to ten times the speed of a conventional program interpreter running on the same computer.

Alternate Embodiments

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

TABLE 1

BYTECODES IN JAVA LANGUAGE

| INSTRUCTION NAME | SHORT DESCRIPTION |
|---|---|
| nop | no operation |
| aconst_null | push null object |
| iconst_m1 | push integer constant −1 |
| iconst_0 | push integer constant 0 |
| iconst_1 | push integer constant 1 |
| iconst_2 | push integer constant 2 |
| iconst_3 | push integer constant 3 |
| iconst_4 | push integer constant 4 |
| iconst_5 | push integer constant 5 |
| lconst_0 | push long 0L |
| lconst_1 | push long 1L |
| fconst_0 | push float constant 0.0 |
| fconst_1 | push float constant 1.0 |
| fconst_2 | push float constant 2.0 |
| dconst_0 | push double float constant 0.0d |
| dconst_1 | push double float constant 1.0d |
| bipush | push byte-sized value |
| sipush | push two-byte value |
| ldc | load a constant from constant table (1 byte index) |
| ldc_w | load a constant from constant table (2 byte index) |
| ldc2_w | load a 2-word constant... |
| iload | load local integer variable |
| lload | load local long variable |
| fload | load local floating variable |
| dload | load local double variable |
| aload | load local object variable |
| iload_0 | load local integer variable #0 |
| iload_1 | load local integer variable #1 |
| iload_2 | load local integer variable #2 |
| iload_3 | load local integer variable #3 |
| lload_0 | load local long variable #0 |
| lload_1 | load local long variable #1 |
| lload_2 | load local long variable #2 |
| lload_3 | load local long variable #3 |
| fload_0 | load local float variable #0 |
| fload_1 | load local float variable #1 |
| fload_2 | load local float variable #2 |
| fload_3 | load local float variable #3 |
| dload_0 | load lcl double float variable #0 |
| dload_1 | load lcl double float variable #1 |
| dload_2 | load lcl double float variable #2 |
| dload_3 | load lcl double float variable #3 |
| aload_0 | load local object variable #0 |
| aload_1 | load local object variable #1 |
| aload_2 | load local object variable #2 |
| aload_3 | load local object variable #3 |
| iaload | load from array of integer |
| laload | load from array of long |
| faload | load from array of float |
| daload | load from array of double |
| aaload | load from array of object |
| baload | load from array of (signed) bytes |
| caload | load from array of chars |
| saload | load from array of (signed) shorts |
| istore | store local integer variable |
| lstore | store local long variable |
| fstore | store local float variable |
| dstore | store local double variable |
| astore | store local object variable |
| istore_0 | store local integer variable #0 |
| istore_1 | store local integer variable #1 |
| istore_2 | store local integer variable #2 |
| istore_3 | store local integer variable #3 |
| lstore_0 | store local long variable #0 |
| lstore_1 | store local long variable #1 |
| lstore_2 | store local long variable #2 |
| lstore_3 | store local long variable #3 |
| fstore_0 | store local float variable #0 |
| fstore_1 | store local float variable #1 |
| fstore_2 | store local float variable #2 |
| fstore_3 | store local float variable #3 |
| dstore_0 | store lcl double float variable #0 |
| dstore_1 | store lcl double float variable #1 |
| dstore_2 | store lcl double float variable #2 |
| dstore_3 | store lcl double float variable #3 |
| astore_0 | store local object variable #0 |
| astore_1 | store local object variable #1 |
| astore_2 | store local object variable #2 |
| astore_3 | store local object variable #3 |
| iastore | store into array of int |
| lastore | store into array of long |
| fastore | store into array of float |
| dastore | store into array of double float |
| aastore | store into array of object |
| bastore | store into array of (signed) bytes |
| castore | store into array of chars |
| sastore | store into array of (signed) shorts |
| pop | pop top element |

TABLE 1-continued

BYTECODES IN JAVA LANGUAGE

| INSTRUCTION NAME | SHORT DESCRIPTION |
|---|---|
| pop2 | pop top two elements |
| dup | dup top element |
| dup_x1 | dup top element. Skip one |
| dup_x2 | dup top element. Skip two |
| dup2 | dup top two elements. |
| dup2_x1 | dup top 2 elements. Skip one |
| dup2_x2 | dup top 2 elements. Skip two |
| swap | swap top two elements of stack. |
| iadd | integer add |
| ladd | long add |
| fadd | floating add |
| dadd | double float add |
| isub | integer subtract |
| lsub | long subtract |
| fsub | floating subtract |
| dsub | floating double subtract |
| imul | integer multiply |
| lmul | long multiply |
| fmul | floating multiply |
| dmul | double float multiply |
| idiv | integer divide |
| ldiv | long divide |
| fdiv | floating divide |
| ddiv | double float divide |
| irem | integer mod |
| lrem | long mod |
| frem | floating mod |
| drem | double float mod |
| ineg | integer negate |
| lneg | long negate |
| fneg | floating negate |
| dneg | double float negate |
| ishl | shift left |
| lshl | long shift left |
| ishr | shift right |
| lshr | long shift right |
| iushr | unsigned shift right |
| lushr | long unsigned shift right |
| iand | boolean and |
| land | long boolean and |
| ior | boolean or |
| lor | long boolean or |
| ixor | boolean xor |
| lxor | long boolean xor |
| iinc | increment lcl variable by constant |
| i2l | integer to long |
| i2f | integer to float |
| i2d | integer to double |
| l2i | long to integer |
| l2f | long to float |
| l2d | long to double |
| f2i | float to integer |
| f2l | float to long |
| f2d | float to double |
| d2i | double to integer |
| d2l | double to long |
| d2f | double to float |
| int2byte | integer to byte |
| int2char | integer to character |
| int2short | integer to signed short |
| lcmp | long compare |
| fcmpl | float compare. −1 on incomparable |
| fcmpg | float compare. 1 on incomparable |
| dcmpl | dbl floating cmp. −1 on incomp |
| dcmpg | dbl floating cmp. 1 on incomp |

TABLE 1-continued

BYTECODES IN JAVA LANGUAGE

| INSTRUCTION NAME | SHORT DESCRIPTION |
|---|---|
| ifeq | goto if equal |
| ifne | goto if not equal |
| iflt | goto if less than |
| ifge | goto if greater than or equal |
| ifgt | goto if greater than |
| ifle | goto if less than or equal |
| if_icmpeq | compare top two elements of stack |
| if_icmpne | compare top two elements of stack |
| if_icmplt | compare top two elements of stack |
| if_icmpge | compare top two elements of stack |
| if_icmpgt | compare top two elements of stack |
| if_icmple | compare top two elements of stack |
| if_acmpeq | compare top two objects of stack |
| if_acmpne | compare top two objects of stack |
| goto | unconditional goto |
| jsr | jump subroutine |
| ret | return from subroutine |
| tableswitch | goto (case) |
| lookupswitch | goto (case) |
| ireturn | return integer from procedure |
| lreturn | return long from procedure |
| freturn | return float from procedure |
| dreturn | return double from procedure |
| areturn | return object from procedure |
| return | return (void) from procedure |
| getstatic | get static field value. |
| putstatic | assign static field value |
| getfield | get field value from object. |
| putfield | assign field value to object. |
| invokevirtual | call method, based on object. |
| invokenonvirtual | call method, not based on object. |
| invokestatic | call a static method. |
| invokeinterface | call an interface method |
| new | Create a new object |
| newarray | Create a new array of non-objects |
| anewarray | Create a new array of objects |
| arraylength | get length of array |
| athrow | throw an exception |
| checkcast | error if object not of given type |
| instanceof | is object of given type? |
| monitorenter | enter a monitored region of code |
| monitorexit | exit a monitored region of code |
| wide | prefix operation. |
| multianewarray | create muitidimensional array |
| ifnull | goto if null |
| ifnonnull | goto if not null |
| goto_w | unconditional goto. 4byte offset |
| jsr_w | jump subroutine. 4byte offset |
| breakpoint | call breakpoint handler |

TABLE 2

Pseudocode for JAVA Bytecode Verifier

```
Receive Object Class File with one or more bytecode programs to be verified.
/*    Perform initial checks that do not require inspection of bytecodes    */
If file format of the class file is improper
    {
    Print appropriate error message
    Return with Abort return code
    }
If (A) any "final" class has a subclass;
    (B) the class is a subclass of a "final" class;
    (C) any method in the class overrides a "final" method in a superclass; or
    (D) any class reference, field reference and method reference in the
        constant pool does not have a legal name, class and type signature
    {
    Print appropriate error message
    Return with Abort return code
    }
For each Bytecode Method in the Class
    {
    /*    Data-flow analysis is performed on each method of the class being
        verified */
    If: (A) any branch instruction would branch into the middle of an
        instruction,
        (B) any register references access or modify a register having a
        register number higher than the number of registers used by the
        method,
        (C) the method ends in the middle of an instruction,
        (D) any instruction having a reference into the constant pool does not
        match the data type of the referenced constant pool item,
        (E) any exception handler does not have properly specified starting
        and ending points,
        {
        Print appropriate error message
        Return with Abort return code
        }
    Create: status data structures: stack counter, stack status array, register
        status array, jsr bit vector array
    Create SnapShot array with one SnapShot for every instruction in the
        bytecode program
    Initialize SnapShot for first instruction of program to indicate the stack is
        empty and the registers are empty except for data types indicated by
        the method's type signature (i.e., for arguments to be passed to the
        method)
    Initialize Snapshots for all other instructions to indicate that the
        instruction has not yet been visited
    Set the "changed" bit for the first instruction of the program
    Set VerificationSuccess to True
    Do Until there are no instructions whose changed bit is set
        {
        Select a next instruction (e.g., in sequential order in program) whose
            changed bit is set
        Load SnapShot for the selected instruction (showing status of stack
            and registers prior to execution of the selected instruction) into
            the stack counter, virtual stack and the virtual register array, and
            jsr bit vector array, respectively.
        Turn off the selected instruction's changed bit
        /* Emulate the effect of this instruction on the stack and registers*/
        Case(Instruction Type):
            {
            Case=Instruction pops data from Operand Stack
                {
                Pop operand data type information from Virtual Stack
            Update Stack Counter
            If Virtual Stack has Underflowed
                {
                Print error message identifying place in program that
                    underflow occurred
                Abort Verification
                Return with abort return code
                }
            Compare data type of each operand popped from virtual
                stack with data type required (if any) by the bytecode
                instruction
            If type mismatch
                {
                Print message identifying place in program that data type
                    mismatch occurred
```

TABLE 2-continued

Pseudocode for JAVA Bytecode Verifier

```
            Set VerificationSuccess to False
            Return with abort return code
            }
        }
    Case=Instruction pushes data onto Operand Stack
        {
        Push data type information onto Virtual Stack
        Update stack counter
        If Virtual Stack has Overflowed
            {
            Print message identifying place in program that overflow
                occurred
            Set VerificationSuccess to False
            Return with abort return code
            }
        }
    Case=Instruction uses data stored in a register
        {
        If type mismatch
            {
            Print message identifying place in program that data type
                mismatch occurred
            Set VerificationSuccess to False
            }
        }
    Case=Instruction modifies a register
        {
        Update Virtual Register Array to indicate changed register's
            new data type
        If instruction places an uninitialized object in a register and
            the instruction is protected by any exception handler
            (including the special exception handler for a "finally"
            code block)
            {
            Print error message
            Set VerificationSuccess to False
            }
        }
    Case=Backwards Branch
        {
        If Virtual Stack or Virtual Register Array contain any
            uninitialized object data types
            {
            Print error message
            Set VerificationSuccess to False
            }
        }
} /* EndCase */
/* Update jsr bit vector array */
If the current instruction is in a subroutine that is the target of a jsr
    {
    For each level of jsr applicable to the current instruction
        {
        Update corresponding jsr bit vector to indicate register(s)
            accessed or modified by the current instruction
        /* Set of "marked" registers can only be increased, not
            decreased */
        }
    }
/* Update all affected SnapShots and changed bits   */
Determine set of all successor instructions, including:
    (A) the next instruction if the current instruction is not an
        unconditional goto, a return, or a throw,
    (B) the target of a conditional or unconditional branch,
    (C) all exception handlers for this instruction,
    (D) when the current instruction is a return instruction, the
        successor instructions are the instructions immediately
        following all jsr's that target the called subroutine.
If the program can "fall off" the last instruction
    {
    Set VerificationSuccess to False
    Return with Abort return code value
    }
/*  Merge the stack counter, virtual stack, virtual register array and jsr bit
    vector arrays into the SnapShots of each of the successor
    instructions */
```

TABLE 2-continued

Pseudocode for JAVA Bytecode Verifier

```
Do for each successor instruction:
    {
    If the successor instruction is the first instruction of an exception
        handler,
        {
        Change the Stack Status portion of the SnapShot of the
            successor instruction to contain a single object of the
            exception type indicated by the exception handler
            information.
        Set stack counter of the SnapShot of the successor
            instruction to 1.
        Performs steps noted below for successor instruction
            handling only with respect to the virtual register array
            and jsr bit vector array.
        }
    If this is the first time the SnapShot for a successor instruction
        has been visited
        {
        Copy the stack counter, virtual stack, virtual register array
            and jsr bit vector array into the SnapShot for the
            successor instruction
        Set the changed bit for the successor instruction
        }
    Else   /* the instruction has been visited before */
        {
        If the stack counter in the Status Array does not match the
            stack counter in the existing SnapShot, or the two stacks
            are not identical with regard to data types (except for
            differently typed object handles)
            {
            Set VerificationSuccess to False
            Return with Abort return code value
            }
        Merge the Virtual Stack and Virtual Register Array values
            into the values of the existing SnapShot:
            (A) if two corresponding stack elements or two
            corresponding register elements contain different object
            handles, replace the specified data type for the stack or
            register element with the closest common ancestor of the
            two handle types;
            (B) if two corresponding register elements contain
            different data types (other than handles), denote the
            specified data type for the register element in the new
            SnapShot as "unknown" (i.e., unusable);
            (C) follow special merger rules for merging register status
            information when the successor instruction is the
            instruction immediately after a "jsr" instruction and the
            current instruction is a "ret" instruction:
                1)  for any register that the bit vector indicates that the
                    subroutine has accessed or modified, use the data
                    type of the register at the time of the return, and
                2)  for other registers, use the data type of the register at
                    the time of the preceding jsr instruction.
            /* Note that return, break and continue instructions inside a
                code block protected by a "finally" exception handler are
                treated the same as a "jsr" instruction (for a subroutine
                call to the "finally" exception handler) for verification
                purposes. */
            Copy the jsr bit vectors into the SnapShot of the successor
                instructions only to the extent that those successor
                instructions are inside the same subroutines as the
                current instruction.
            Set the changed bit for each successor instruction for which
                the merging of the stack and register values caused any
                change to the successor instruction's SnapShot.
            }
        }   /* End of Do Loop for Successor Instructions */
    }       /* End of Do Loop for Instruction Emulation */
}           /* End of Loop for Bytecode Methods */
Return (VerificationSuccess)
```

TABLE 3

Pseudocode for Bytecode Class Loader and Interpreter

```
Procedure: ClassLoader (Class, Pgm)
{
If the Class has not already been loaded and verified
    {
    Receive Class
    Call Bytecode Verifier to verify all bytecode programs in the class
    If Not VerificationSuccess
        {
        Print or display appropriate error message
        Return
        }
    }
Interpret and execute Pgm (the specified bytecode program) without
    performing operand stack overflow and underflow checks and without
    performing data type checks on operands stored in operand stack.
}
```

What is claimed is:

1. A method, comprising:

selectively connecting a computer system via a network to a sending computer to receive from the sending computer a program formed of low-level, stack-oriented, program code;

verifying prior to execution that when an instruction of the program is executed that can be executed along more than one execution path, a number of operands on a stack when arriving at that instruction during execution is identical regardless of the execution path taken to arrive at the instruction, and a type state of the stack when arriving at the instruction during execution of a first execution path that includes the instruction is compatible with a type state of the stack when arriving at the instruction during execution of all other execution paths that include the instruction; and executing the verified program.

2. The method of claim 1, wherein the verifying includes confirming prior to execution of the program that the number of operands on the stack when arriving at the instruction that can be executed along more than one execution path is identical for all execution paths that include the instruction, even when the stack is not empty prior to execution of the instruction.

3. The method of claim 1, wherein the verifying includes confirming prior to execution of the program that execution of any loop in the program will not result in a net addition or deletion of operands on the stack.

4. The method of claim 1, wherein when the program is executed no check is made for overflow and underflow of the stack.

5. The method of claim 1, wherein t he verifying includes verifying prior to execution that when a loop of the program is executed, immediately before and after each iteration of the loop, a number of operands an the s tack is identical, even when the stack is not empty, and a type state of the stack remains compatible with an initial type state of the stack regardless of how many times the loop is executed.

6. The method of claim 1, wherein the executing includes executing the program without performing a check during execution of the program that corresponds to a check performed by the verifying.

7. The method of claim 1, wherein each instruction of the program comprises one or more bytecodes, and wherein the verifying includes determining whether execution of any bytecoded instruction in the program would violate predetermined data type restrictions for that instruction.

8. The method of claim 1, wherein at least one instruction of the program comprises one or more bytecodes that represent an operation on a specific data type and is selected from the group consisting of: aaload, aastore, aconst_null, aload, areturn, arraylength, astore, astore_<n>, athrow, bipush, breakpoint, catchsetup, catchteardown, checkcast, df2, d2i, d2l, dadd, daload, dastore, dcmpg, dcmpl, dconst_<d>, ddiv, dload, dload_<d>, dmod, dmul, dneg, dreturn, dstore, dstore_<n>, dsub, dup, dup2, dup2_x1, dup2_x2, dup_x1, dup_x2, f2d, f2i, f2l, fadd, faload, fastore, fcmpg, fcmpl, fconst_<f>, fdiv, fload, fload_<n>, fmod, fmul, fneg, freturn, fstore, fstore_<n>, fsub, gatfield, getstatic, goto, i2d, i2f, i2l, iadd, iaload, iand, iastore, iconst_<n>, iconst_m1, idiv, if_acmpeq, if_acmpne, if_icmpeq, if_icmpge, if_icmpgt, if_icmple, if_icmplt, if_icmpne, ifeq, ifge, ifgt, ifle, iflt, ifne; iinc, iload, iload_<n>, imod, imul, ineg, instanceof, int2byte, int2char, invokeinterface, invokemethod, invokesuper, ior, ireturn, ishl, lshr, istore, istore_<n>, isub, iushr, ixor, jsr, l2d, l2f, l2i, ladd, laload, land, lastore, lcmp, lconst_<l>, ldc1, ldc2, ldc2w, ldiv, lload, lload_<n>, lmod, lmul, lneg, lookupswitch, lor, lreturn, lshl, lshr, lstore, lstore_n>, lsub, lushr, lxor, monitorenter, monitorexit, new, newarray, newfromname, nop, pop, pop2, putfield, putstatic, ret, return, saload, sastore, siaload, siastore, sipush, tableswitch, and verifystack.

9. The method of claim 1, wherein the verifying includes certifying that the program complies with a stack non-overflow constraint and a stack non-underflow constraint.

10. The method of claim 1, wherein the verifying includes using a virtual stack to track the type state of the stack.

11. The method of claim 1, wherein the verifying includes using an array of virtual local variables to track a type state of local variables used by the program.

12. A computer system, comprising:

means for selectively connecting the computer system via a network to a sending computer to receive from the sending computer a program formed of low-level, stack-oriented, program code;

memory for storing the program;

a data processing unit for executing programs stored in the memory;

a program verifier, stored in the memory and executed by the data processing unit, the program verifier including instructions for verifying prior to execution that when an instruction of the program is executed that can be executed along more than one execution path, a number of operands on a stack when arriving at that instruction during execution is identical regardless of the execution path taken to arrive at the instruction, and a type state of the stack when arriving at the instruction during execution of a first execution path that includes the instruction is compatible with a type state of the stack when arriving at the instruction during execution of all other execution paths that include the instruction; and a program execution module for executing the verified program.

13. The computer system of claim 12, wherein the verifying instructions include instructions for confirming prior to execution of the program that the number of operands on the stack when arriving at the instruction that can be executed along more than one execution path is identical for all execution paths that include the instruction, even when the stack is not empty prior to execution of the instruction.

14. The computer system of claim 12, wherein the verifying instructions include instructions for confirming prior to execution of the program that execution of any loop in the program will not result in a net addition or deletion of operands on the stack.

15. The computer system of claim 12, wherein the program execution module does not check for overflow and underflow of the stack when executing the verified program.

16. The computer system of claim 12, wherein the verifying instructions include instructions for verifying prior to execution that when a loop of the program is executed, immediately before and after each iteration of the loop, a number of operands on the stack is identical, even when the stack is not empty, and a type state of the stack remains compatible with an initial type state of the stack regardless of how many times the loop is executed.

17. The computer system of claim 12, wherein the program execution module includes instructions for executing the program with out performing a check during execution of the pro gram that corresponds to a check performed by the program verifier.

18. The computer system of claim 12, wherein each instruction of the program comprises one or more bytecodes, and wherein the program verifier includes instructions for determining whether execution of any bytecoded instruction in the program would violate predetermined data type restrictions for that instruction.

19. The computer system of claim 12, wherein at least one instruction of the program comprises one or more bytecodes that represent an operation on a specific data type and is selected from the group consisting of: aaload, aastore, aconst_null, aload, areturn, arraylength, astore, astore_<n>, athrow, bipush, breakpoint, catchsetup, catchteardown, checkcast, df2, d2i, d2l, dadd, daload, dastore, dcmpg, dcmpl, dconst_<d>, ddiv, dload, dload_<d>, dmod, dmul, dneg, dreturn, dstore, dstore_<n>, dsub, dup, dup2, dup2_x1, dup2_x2, dup_x1, dup_—x2, f2d, f2i, f2l, fadd, faload, fastore, fempg, fempl, fconst_<f>, fdiv, fload, fload_<n>, fmod, fmul, fneg, freturn, fstore, fstore_<n>, fsub, gatfield, getstatic, goto, i2d, i2f, i2l, iadd, iaload, iand, iastore, iconst_<n>, iconst_m1, idiv, if_acmpeq, if_acmpne, if_icmpeq, if_icmpge, if_icmpgt, if_icmple, if_icmplt, if_icmpne, ifeq, ifge, ifgt, ifle, iflt, ifne, iinc, iload, iload_<n>, imod, imul, ineg, instanceof, int2byte, int2char, invokeinterface, invokemethod, invokesuper, ior, ireturn, ishl, Ishr, istore, istore_<n>, isub, iushr, ixor, jsr, l2d, l2f, l2i, ladd, laload, land, lastore, lcmp, lconst_<l>, lda1, ldc2, ldc2w, ldiv, lload, lload_<n>, lmod, lmul, lneg, lookupswitch, lor, lreturn, lshl, lshr, lstore, lstore_<n>, lsub, lushr, lxor, monitorenter, monitorexit, new, newarray, newfromname, nop, pop, pop2, putfield, putstatic, ret, return, saload, sastore, sialoadload, siastore, sipush, tableswitch, and verifystack.

20. The computer system of claim 12, wherein the program verifier includes instructions for certifying that the program complies with a stack non-overflow constraint and a stack non-underflow constraint.

21. The computer system of claim 12, wherein the program verifier includes instructions using a virtual stack to track the type state of the stack.

22. The computer system of claim 12, wherein the program verifier includes instructions using an array of virtual local variables to track a type state of local variables used by the program.

23. A computer program product for use in conjunction with a computer system, the computer program product comprising a computer readable storage medium and a computer program mechanism embedded therein, the computer program mechanism comprising:

a program verifier, for analyzing a program formed of low-level, stack-oriented, program code; the program verifier including instructions for verifying prior to execution of the program that when an instruction of the program is executed that can be executed along more than one execution path, a number of operands on a stack when arriving at that instruction during execution is identical regardless of the execution path taken to arrive at the instruction, and a type state of the stack when arriving at the instruction during execution of a first execution path that includes the instruction is compatible with a type state of the stack when arriving at the instruction during execution of all other execution paths that include the instruction; and a program execution module for executing the verified program.

24. The computer program product of claim 23, wherein the verifying instructions include instructions for confirming prior to execution of the program that the number of operands on the stack when arriving at the instruction that can be executed along more than one execution path is identical for all execution paths that include the instruction, even when the stack is not empty prior to execution of the instruction.

25. The computer program product of claim 23, wherein the verifying instructions include instructions for confirming prior to execution of the program that execution of any loop in the program will not result in a net addition or deletion of operands on the stack.

26. The computer program product of claim 23, wherein the program execution module does not check for overflow and underflow of the stack when executing the verified program.

27. The computer program product of claim 23, wherein the verifying instructions include instructions for verifying prior to execution that when a loop of the program is executed, immediately before and after each iteration of the loop, a number of operands on the stack is identical, even when the stack is not empty, and a type associated with each of the operands on the stack is compatible regardless of how many times the loop is executed.

28. The computer program product of claim 23, wherein the program execution module includes instructions for executing the program without performing a check during execution of the program that corresponds to a check performed by the program verifier.

29. The computer program product of claim 23, wherein each instruction of the program comprises one or more bytecodes, and wherein the program verifier includes instructions for determining whether execution of any bytecoded instruction in the program would violate predetermined data type restrictions for that instruction.

30. The computer program product of claim 23, wherein at least one instruction of the program comprises one or more bytecodes that represent an operation on a specific data type and is selected from the group consisting of: aaload, aastore, aconst_null, aload, areturn, arraylength, astore, astore_<n>, athrow, bipush, breakpoint, catchsetup, catchteardown, checkcast, df2, d2i, d2l, dadd, daload, dastore, dcmpg, dcmpl, dconst_<d>, ddiv, dload, dload_<d>, dmod, dmul, dneg, dreturn, dstore, dstore_<n>, dsub, dup, dup2, dup2_x1, dup2_x2, dup_x1, dup_—x2, f2d, f2i, f2l, fadd, faload, fastore, fempg, fempl, fconst_<f>, fdiv, fload, fload_<n>, fmod, fmul, fneg, freturn, fstore, fstore_<n>, fsub, gatfield, getstatic, goto, i2d, i2f, i2l, iadd, iaload, iand, iastore, iconst_<n>, iconst_m1, idiv, if_acmpeq, if_acmpne, if_icmpeq, if_icmpge, if_icmpgt, if_icmple, if_icmplt, if_icmpne, ifeq, ifge, ifgt, ifle, iflt, ifne, iinc, iload, iload_<n>, imod, imul, ineg, instanceof, int2byte, int2char, invokeinterface, invokemethod, invokesuper, ior, ireturn, ishl, Ishr, istore, istore_<n>, isub, iushr, ixor, jsr, 12d, 12f, 12i, ladd, laload, land, lastore, lcmp, lconst_<1>, ldc1, ldc2, ldc2w, ldiv, lload, lload_<n>, lmod, lmul, lneg, lookupswitch, lor, lreturn, lshl, lshr, lstore, lstore_<n>, lsub, lushr, lxor, monitorenter, monitorexit, new, newarray, newfromname, nop, pop, pop2, putfield, putstatic, ret, return, saload, sastore, siaload, siastore, sipush, tableswitch, and verifystack.

31. The computer program product of claim 23, wherein the program verifier includes instructions for certifying that the program complies with a stack non-overflow constraint and a stack non-underflow constraint.

32. The computer program product of claim 23, wherein the program verifier includes instructions using a virtual stack to track the type state of the stack.

33. The computer program product of claim 23, wherein the program verifier includes instructions using an array of virtual local variables to track a type state of local variables used by the program.

34. A method comprising:
providing a program formed of low-level, stack-oriented, program code; and
making the program available to a computer system via a network;
wherein after the computer system accesses the program, the computer system verifies prior to execution of the program that when an instruction of the program is executed that can be executed along more than one execution path, a number of operands on a stack when arriving at that instruction during execution is identical regardless of the execution path taken to arrive at the instruction, and a type state of the stack when arriving at the instruction during execution of a first execution path that includes the instruction is compatible with a type state of the stack when arriving at the instruction during execution of all other execution paths that include the instruction.

35. The method of claim 34, wherein the computer system confirms prior to execution of the program that the number of operands on the stack when arriving at the instruction that can be executed along more than one execution path is identical for all execution paths that include the instruction, even when the stack is not empty prior to execution of the instruction.

36. The method of claim 34, wherein the computer system confirms prior to execution of the program that execution of any loop in the program will not result in a net addition or deletion of operands on the stack.

37. The method of claim 34, wherein the computer system confirms prior to execution of the program that when a loop of the program is executed, immediately before and after each iteration of the loop, a number of operands on the stack is identical, even when the stack is not empty, and a type associated with each of the operands on the stack is compatible regardless of how many times the loop is executed.

38. The method of claim 34, including executing the program without performing a check during execution of the program that corresponds to a check performed by the computer system prior to execution of the program.

39. The method of claim 34, wherein each instruction of the program comprises one or more bytecodes, and wherein the computer system determines prior to execution of the program whether execution of any bytecoded instruction in the program would violate predetermined data type restrictions for that instruction.

40. The method of claim 34, wherein at least one instruction of the program comprises one or more bytecodes that represent an operation on a specific data type and is selected from the group consisting of: aaload, aastore, aconst-null, aload, areturn, arraylength, astore, astore_<n>, athrow, bipush, breakpoint, catchsetup, catchteardown, checkcast, df2, d2i, d2l, dadd, daload, dastore, dcmpg, dcmpl, dconst_<d>, ddiv, dload, dload_<d>, dmod, dmul, dneg, dreturn, dstore, dstore_<n>, dsub, dup, dup2, dup2_x1, dup2_x2, dup_x1, dup_—x2, f2d, f2i, f2l, fadd, faload, fastore, fempg, fempl, fconst_<f>, fdiv, fload, fload_<n>, fmod, fmul, fneg, freturn, fstore, fstore_<n>, fsub, gatfield, getstatic, goto, i2d, i2f, i2l, iadd, iaload, iand, iastore, iconst_<n>, iconst_m1, idiv, if_acmpeq, if_acmpne, if_icmpeq, if_icmpge, if_icmpgt, if_icmple, if_icmplt, if_icmpne, ifeq, ifge, ifgt, ifle, iflt, ifne, iinc, iload, iload_<n>, imod, imul, ineg, instanceof, int2byte, int2char, invokeinterface, invokemethod, invokesuper, ior, ireturn, ishl, Ishr, istore, istore_<n>, isub, iushr, ixor, jsr, 12d, 12f, 12i, ladd, laload, land, lastore, lcmp, lconst_<1>, ldc1, ldc2, ldc2w, ldiv, lload, lload_<n>, lmod, lmul, lneg, lookupswitch, lor, lreturn, lshl, lshr, lstore, lstore_<n>, lsub, lushr, lxor, monitorenter, monitorexit, new, newarray, newfromname, nop, pop, pop2, putfield, putstatic, ret, return, saload, sastore, siaload, siastore, sipush, tableswitch, and verifystack.

41. The method of claim 34, wherein the computer system, prior to execution of the program, verifies that the program complies with a stack non-overflow constraint and a stack non-underflow constraint.

42. The method of claim 34, wherein the computer system, prior to execution of the program, uses a virtual stack to track the type state of the stack during execution of the program.

43. The method of claim 34, wherein the computer system, prior to execution of the program, uses an array of virtual local variables to track a type state of local variables used during execution of the program.

44. A computer system, comprising:
memory for storing a program formed of low-level, stack-oriented, program code;
a data processing unit for executing programs stored in the memory;
a program verifier, stored in the memory and executed by the data processing unit, the program verifier including instructions for verifying, prior to execution, that when an instruction of the program is executed that can be executed along more than one execution path, a number of operands on a stack when arriving at that instruction during execution is identical regardless of the execution path taken to arrive at the instruction, and a type state of the stack when arriving at the instruction during execution of a first execution path that includes the instruction is compatible with a type state of the stack when arriving at the instruction during execution of all other execution paths that include the instruction.

45. The computer system of claim 44, wherein the verifying instructions include instructions for confirming prior to execution of the program that the number of operands on the stack when arriving at the instruction that can be executed along more than one execution path is identical for all execution paths that include the instruction, even when the stack is not empty prior to execution of the instruction.

46. The computer system of claim 44, wherein the verifying instructions include instructions for confirming prior to execution of the program that execution of any loop in the program will not result in a net addition or deletion of operands on the stack.

47. The computer system of claim 44, wherein the verifying instructions include instructions for verifying prior to execution that when a loop of the program is executed, immediately before and after each iteration of the loop, a number of operands on the stack is identical, even when the stack is not empty, and a type associated with each of the operands on the stack is compatible regardless of how many times the loop is executed.

48. The computer system of claim 44, including a program execution module having instructions for executing the program without performing a check during execution of the program that corresponds to a check performed by the program verifier.

49. The computer system of claim 44, wherein each instruction of the program comprises one or more bytecodes, and wherein the program verifier includes instructions for determining whether execution of any bytecoded instruction in the program would violate predetermined data type restrictions for that instruction.

50. The computer system of claim 44, wherein at least one instruction of the program comprises one or more bytecodes that represent an operation on a specific data type and is selected from the group consisting of: aaload, aastore, aconst_null, aload, areturn, arraylength, astore, astore_<n>, athrow, bipush, breakpoint, catchsetup, catchteardown, checkcast, df2, d2i, d2l, dadd, daload, dastore, dcmpg, dcmpl, dconst_<d>, ddiv, dload, dload_<d>, dmod, dmul, dneg, dreturn, dstore, dstore_<n>, dsub, dup, dup2, dup2_x1, dup2_x2, dup_x1, dup_—x2, f2d, f2i, f2l, fadd, faload, fastore, fcmpg, fcmpl, fconst_<f>, fdiv, fload, fload_<n>, fmod, fmul, fneg, freturn, fstore, fstore_<n>, fsub, gatfield, getstatic, goto, i2d, i2f, i2l, iadd, iaload, iand, iastore, iconst_<n>, iconst_m1, idiv, if_acmpeq, if_acmpne, if_icmpeq, if_icmpge, if_icmpgt, if_icmple, if_icmplt, if_icmpne, ifeq, ifge, ifgt, ifle, iflt, ifne, iinc, iload, iload_<n>, imod, imul, ineg, instanceof, int2byte, int2char, invokeinterface, invokemethod, invokesuper, ior, ireturn, ishl, Ishr, istore, istore_<n>, isub, iushr, ixor, jsr, l2d, l2f, l2i, ladd, laload, land, lastore, lcmp, lconst_<1>, ldc1, ldc2, ldc2w, ldiv, lload, lload_<n>, lmod, lmul, lneg, lookupswitch, lor, lreturn, lshl, lshr, lstore, lstore_<n>, lsub, lushr, lxor, monitorenter, monitorexit, new, newarray, newfromname, nop, pop, pop2, putfield, putstatic, ret, return, saload, sastore, siaload, siastore, sipush, tableswitch, and verifystack.

51. The computer system of claim 44, wherein the program verifier includes instructions for certifying that the program complies with a stack non-overflow constraint and a stack non-underflow constraint.

52. The computer system of claim 44, wherein the program verifier includes instructions using a virtual stack to track the type state of the stack.

53. The computer system of claim 44, wherein the program verifier includes instructions using an array of virtual local variables to track a type state of local variables used by the program.

54. A computer program product for use in conjunction with a computer system, the computer program product comprising a computer readable storage medium and a computer program mechanism embedded therein, the computer program mechanism comprising:

a program verifier for analyzing a program formed of low-level, stack-oriented, program code, the program verifier including instructions for verifying at run time, prior to execution, that when an instruction of the program is executed that can be executed along more than one execution path, a number of operands on a stack when arriving at that instruction during execution is identical regardless of the execution path taken to arrive at the instruction, and a type state of the stack when arriving at the instruction during execution of a first execution path that includes the instruction is compatible with a type state of the stack when arriving at the instruction during execution of all other execution paths that include the instruction.

55. The computer program product of claim 54, wherein the verifying instructions include instructions for confirming prior to execution of the program that a number of operands on the stack when arriving at the instruction that can be executed along more than one execution path is identical for all execution paths that include the instruction, even when the stack is not empty prior to execution of the instruction.

56. The computer program product of claim 54, wherein the verifying instructions include instructions for confirming prior to execution of the program that execution of any loop in the program will not result in a net addition or deletion of operands on the stack.

57. The computer program product of claim 54, wherein the verifying instructions include instructions for verifying prior to execution that when a loop of the program is executed, immediately before and after each iteration of the loop, a number of operands on the stack is identical, even when the stack is not empty, and a type associated with each of the operands on the stack is compatible regardless of how many times the loop is executed.

58. The computer program product of claim 54, further including a program execution module having instructions for executing the program without performing a check during execution of the program that corresponds to a check performed by the program verifier.

59. The computer program product of claim 54, wherein each instruction of the program comprises one or more bytecodes, and wherein the program verifier includes instructions for determining whether execution of any bytecoded instruction in the program would violate predetermined data type restrictions for that instruction.

60. The computer program product of claim 54, wherein at least one instruction of the program comprises one or more bytecodes that represent an operation on a specific data type and is selected from the group consisting of: aaload, aastore, aconst_null, aload, areturn, arraylength, astore, astore_<n>, athrow, bipush, breakpoint, catchsetup, catchteardown, checkcast, df2, d2i, d2l, dadd, daload, dastore, dcmpg, dcmpl, dconst_<d>, ddiv, dload, dload_<d>, dmod, dmul, dneg, dreturn, dstore, dstore_<n>, dsub, dup, dup2, dup2_x1, dup2_x2, dup_x1, dup_—x2, f2d, f2i, f2l, fadd, faload, fastore, fcmpg, fcmpl, fconst_<f>, fdiv, fload, fload_<n>, fmod, fmul, fneg, freturn, fstore, fstore_<n>, fsub, gatfield, getstatic, goto, i2d, i2f, i2l, iadd, iaload, iand, iastore, iconst_<n>, iconst_m1, idiv, if_acmpeq, if_acmpne, if_icmpeq, if_icmpge, if_icmpgt, if_icmple, if_icmplt, if_icmpne, ifeq, ifge, ifgt, ifle, iflt, ifne, iinc, iload, iload_<n>, imod, imul, ineg, instanceof, int2byte, int2char, invokeinterface, invokemethod, invokesuper, ior, ireturn, ishl, Ishr, istore, istore_<n>, isub, iushr, ixor, jsr, l2d, l2f, l2i, ladd, laload, land, lastore, lcmp, lconst_<1>, ldc1, ldc2, ldc2w, ldiv, lload, lload_<n>, lmod, lmul, lneg, lookupswitch, lor, lreturn, lshl, lshr, lstore, lstore_<n>, lsub, lushr, lxor, monitorenter, monitorexit, new, newarray, newfromname, nop, pop, pop2, putfield, putstatic, ret, return, saload, sastore, siaload, siastore, sipush, tableswitch, and verifystack.

61. The computer program product of claim 54, wherein the program verifier includes instructions for certifying that the program complies with a stack non-overflow constraint and a stack non-underflow constraint.

62. The computer program product of claim 54, wherein the program verifier includes instructions using a virtual stack to track the type state of the stack.

63. The computer program product of claim 54, wherein the program verifier includes instructions using an array of virtual local variables to track a type state of local variables used by the program.

64. A method of operating a computer system, comprising:
receiving from a source computer a program formed of low-level, stack-oriented, program code;
verifying at run time, prior to execution, that when an instruction of the program is executed that can be executed along more than one execution path, a number of operands on a stack when arriving at that instruction during execution is identical for all execution paths that include the instruction, and a type state of the stack when arriving at the instruction during execution of a first execution path that includes the instruction is compatible with a type state of the stack when arriving at the instruction during execution of all other execution paths that include the instruction; and
executing the verified program.

65. The method of claim 64, wherein the verifying comprises confirming prior to execution of the program that a number of operands on the stack when arriving at the instruction that can be executed along more than one execution path is identical for all execution paths that include the instruction, even when the stack is not empty prior to execution of the instruction.

66. The method of claim 64, wherein the verifying includes confirming prior to execution of the program that execution of any loop in the program will not result in a net addition or deletion of operands on the stack.

67. The method of claim 64, wherein the verifying includes confirming prior to execution of the program that execution of any loop in the program will not result in a net addition or deletion of operands on the stack.

68. The method of claim 64, wherein the verifying includes verifying prior to execution that when a loop of the program is executed that, immediately before and after each iteration of the loop, a number of operands on the stack is identical, even when the stack is not empty, and a type state of the stack remains compatible with an initial type state of the stack regardless of how many times the loop is executed.

69. The method of claim 64, wherein the executing includes executing the program without performing a check during execution of the program that corresponds to a check performed by the verifying.

70. The method of claim 64, wherein each instruction of the program comprises one or more bytecodes, and wherein the verifying includes determining whether execution of any bytecoded instruction in the program would violate predetermined data type restrictions for that instruction.

71. The method of claim 64, wherein at least one instruction of the program comprises one or more bytecodes that represent an operation on a specific data type and is selected from the group consisting of: aaload, aastore, aconst_null, aload, areturn, arraylength, astore, astore_<n>, athrow, bipush, breakpoint, catchsetup, catchteardown, checkcast, df2, d2i, d2l, dadd, daload, dastore, dcmpg, dcmpl, dconst_<d>, ddiv, dload, dload_<d>, dmod, dmul, dneg, dreturn, dstore, dstore_<n>, dsub, dup, dup2, dup2_x1, dup2_x2, dup_x1, dup_—x2, f2d, f2i, f2l, fadd, faload, fastore, fempg, fempl, fconst_<f>, fdiv, fload, fload_<n>, fmod, fmul, fneg, freturn, fstore, fstore_<n>, fsub, gatfield, getstatic, goto, i2d, i2f, i2l, iadd, iaload, iand, iastore, iconst_<n>, iconst_m1, idiv, if_acmpeq, if_acmpne, if_icmpeq, if_icmpge, if_icmpgt, if_icmple, if_icmplt, if_icmpne, ifeq, ifge, ifgt, ifle, iflt, ifne, iinc, iload, iload_<n>, imod, imul, ineg, instanceof, int2byte, int2char, invokeinterface, invokemethod, invokesuper, ior, ireturn, ishl, Ishr, istore, istore_<n>, isub, iushr, ixor, jsr, l2d, l2f, l2i, ladd, laload, land, lastore, lcmp, lconst_<l>, ldc1, ldc2, ldc2w, ldiv, lload, lload_<n>, lmod, lmul, lneg, lookupswitch, lor, lreturn, lshl, lshr, lstore, lstore_<n>, lsub, lushr, lxor, monitorenter, monitorexit, new, newarray, newfromname, nop, pop, pop2, putfield, putstatic, ret, return, saload, sastore, siaload, siastore, sipush, tableswitch, and verifystack.

72. The method of claim 64, wherein the verifying includes certifying that the program complies with a stack non-overflow constraint and a stack non-underflow constraint.

73. The method of claim 64, wherein the verifying includes using a virtual stack to track the type state of the stack.

74. The method of claim 64, wherein the verifying includes using an array of virtual local variables to track a type state of local variables used by the program.

75. A computer system, comprising:
an interface for receiving a program formed of low-level, stack-oriented, program code;
memory for storing the program;
a data processing unit for executing programs stored in the memory;
a program verifier, stored in the memory and executed by the data processing unit, the program verifier including instructions for verifying prior to execution that when an instruction of the program is executed that can be executed along more than one execution path, a number of operands on a stack when arriving at that instruction during execution is identical regardless of the execution path taken to arrive at the instruction, and a type state of the stack when arriving at the instruction during execution of a first execution path that includes the instruction is compatible with a type state of the stack when arriving at the instruction during execution of all other execution paths that include the instruction; and
a program execution module for executing the verified program.

76. The computer system of claim 75, wherein the verifying instructions include instructions for confirming prior to execution of the program that the number of operands on the stack when arriving at the instruction that can be executed along more than one execution path is identical for all execution paths that include the instruction, even when the stack is not empty prior to execution of the instruction.

77. The computer system of claim 75, wherein the verifying instructions include instructions for confirming prior to execution of the program that execution of any loop in the program will not result in a net addition or deletion of operands on the stack.

78. The computer system of claim 75, wherein the program execution module does not check for overflow and underflow of the stack when executing the verified program.

79. The computer system of claim 75, wherein the verifying instructions include instructions for verifying prior to execution that when a loop of the program is executed, immediately before and after each iteration of the loop, a number of operands on the stack is identical, even when the stack is not empty, and a type state of the stack remains compatible with an initial type state of the stack regardless of how many times the loop is executed.

80. The computer system of claim 75, wherein the program execution module includes instructions for executing the program without performing a check during execution of the program that corresponds to a check performed by the program verifier.

81. The computer system of claim 75, wherein each instruction of the program comprises one or more bytecodes, and wherein the program verifier includes instructions for determining whether execution of any bytecoded instruction in the program would violate predetermined data type restrictions for that instruction.

82. The computer system of claim 75, wherein at least one instruction of the program comprises one or more bytecodes that represent an operation on a specific data type and is selected from the group consisting of: aaload, aastore, aconst_null, aload, areturn, arraylength, astore, astore_<n>, athrow, bipush, breakpoint, catchsetup, catchteardown, checkcast, df2, d2i, d2l, dadd, daload, dastore, dcmpg, dcmpl, dconst_<d>, ddiv, dload, dload_<d>, dmod, dmul, dneg, dreturn, dstore, dstore_<n>, dsub, dup, dup2, dup2_x1, dup2_x2, dup_x1, dup_—x2, f2d, f2i, f2l, fadd, faload, fastore, fempg, fempl, fconst_<f>, fdiv, fload, fload_<n>, fmod, fmul, fneg, freturn, fstore, fstore_<n>, fsub, gatfield, getstatic, goto, i2d, i2f, i2l, iadd, iaload, iand, iastore, iconst_<n>, iconst_m1, idiv, if_acmpeq, if_acmpne, if_icmpeq, if_icmpge, if_icmpgt, if_icmple, if_icmplt, if_icmpne, ifeq, ifge, ifgt, ifle, iflt, ifne, iinc, iload, iload_<n>, imod, imul, ineg, instanceof, int2byte, int2char, invokeinterface, invokemethod, invokesuper, ior, ireturn, ishl, Ishr, istore, istore_<n>, isub, iushr, ixor, jsr, 12d, 12f, 12i, ladd, laload, land, lastore, lcmp, lconst_<l>, ldc1, ldc2, ldc2w, ldiv, lload, lload_<n>, lmod, lmul, lneg, lookupswitch, lor, lreturn, lshl, lshr, lstore, lstore_<n>, lsub, lushr, lxor, monitorenter, monitorexit, new, newarray, newfromname, nop, pop, pop2, putfield, putstatic, ret, return, saload, sastore, siaload, siastore, sipush, tableswitch, and verifystack.

83. The computer system of claim 75, wherein the program verifier includes instructions for certifying that the program complies with a stack non-overflow constraint and a stack non-underflow constraint.

84. The computer system of claim 75, wherein the program verifier includes instructions using a virtual stack to track the type state of the stack.

85. The computer system of claim 75, wherein the program verifier includes instructions using an array of virtual local variables to track a type state of local variables used by the program.

86. The computer system of claim 75, wherein the program is platform independent, and wherein the interface is configured to receive the program from a remote device.

87. The computer system of claim 75, wherein the interface is configured to receive the program from a remote device.

88. A method of operating a computer system, comprising:
  providing a program formed of low-level, stack-oriented, program code;
  verifying, at run time, that when an instruction of the program is executed that can be executed along more than one execution path, a number of operands on a stack when arriving at that instruction during execution is identical for all execution paths that include the instruction, even when the stack is not empty, and a type state of the stack when arriving at the instruction during execution of a first execution path that includes the instruction is compatible with a type state of the stack when arriving at the instruction during execution of all other execution paths that include the instruction; and
  executing the verified program.

89. The method of claim 88, wherein the verifying includes confirming prior to execution of the program that the number of operands on the stack when arriving at the instruction that can be executed along more than one execution path is identical for all execution paths that include the instruction, even when the stack is not empty prior to execution of the instruction.

90. The method of claim 88, wherein the verifying includes confirming prior to execution of the program that execution of any loop in the program will not result in a net addition or deletion of operands on the stack.

91. The method of claim 88, wherein when the program is executed no check is made for overflow and underflow of the stack.

92. The method of claim 88, wherein the verifying includes verifying prior to execution that when a loop of the program is executed, immediately before and after each iteration of the loop, a number of operands on the stack is identical, even when the stack is not empty, and a type state of the stack remains compatible with an initial type state of the stack regardless of how many times the loop is executed.

93. The method of claim 88, wherein the executing includes, when the program has been verified, executing the program without performing a check during execution of the program that corresponds to a check performed during the verifying.

94. The method of claim 88, wherein each instruction of the program comprises one or more bytecodes, and wherein the verifying includes determining whether execution of any bytecoded instruction in the program would violate predetermined data type restrictions for that instruction.

95. The method of claim 88, wherein at least one instruction of the program comprises one or more bytecodes that represent an operation on a specific data type and is selected from the group consisting of: aaload, aastore, aconst_null, aload, areturn, arraylength, astore, astore_<n>, athrow, bipush, breakpoint, catchsetup, catchteardown, checkcast, df2, d2i, d2l, dadd, daload, dastore, dcmpg, dcmpl, dconst_<d>, ddiv, dload, dload_<d>, dmod, dmul, dneg, dreturn, dstore, dstore_<n>, dsub, dup, dup2, dup2_x1, dup2_x2, dup_x1, dup_—x2, f2d, f2i, f2l, fadd, faload, fastore, fempg, fempl, fconst_<f>, fdiv, fload, fload_<n>, fmod, fmul, fneg, freturn, fstore, fstore_<n>, fsub, gatfield, getstatic, goto, i2d, i2f, i2l, iadd, iaload, iand, iastore, iconst_<n>, iconst_m1, idiv, if_acmpeq, if_acmpne, if_icmpeq, if_icmpge, if_icmpgt, if_icmple, if_icmplt, if_icmpne, ifeq, ifge, ifgt, ifle, iflt, ifne, iinc, iload, iload_<n>, imod, imul, ineg, instanceof, int2byte, int2char, invokeinterface, invokemethod, invokesuper, ior, ireturn, ishl, Ishr, istore, istore_<n>, isub, iushr, ixor, jsr, 12d, 12f, 12i, ladd, laload, land, lastore, lcmp, lconst_<l>, ldc1, ldc2, ldc2w, ldiv, lload, lload_<n>, lmod, lmul, lneg, lookupswitch, lor, lreturn, lshl, lshr, lstore, lstore_<n>, lsub, lushr, lxor, monitorenter, monitorexit, new, newarray, newfromname, nop, pop, pop2, putfield, putstatic, ret, return, saload, sastore, siaload, siastore, sipush, tableswitch, and verifystack.

96. The method of claim 88, wherein the verifying includes certifying that the program complies with a stack non-overflow constraint and a stack non-underflow constraint.

97. The method of claim 88, wherein the verifying is performed using a virtual stack to track the type state of the stack.

98. The method of claim 88, wherein the verifying is performed using an array of virtual local variables to track a type state of local variables used by the program.

99. The method of claim 88, wherein the program is platform independent, and wherein the providing includes receiving the program from a remote device.

100. The method of claim 88, wherein the providing includes receiving the program from a remote device.

101. The method of claim 88, wherein the verifying occurs at a point in time prior to execution of the program by the computer system.

102. The computer program product of claim 23, wherein the program is platform independent.

103. A method of operating a computer system, comprising:
  receiving a program formed of low-level, stack-oriented, program code from a server over a network;
  determining whether the program successfully completed a verification process, wherein the verification process verifies, prior to execution of the program, that when an instruction of the program is executed that can be executed along more than one execution path, a number of operands on a stack when arriving at that instruction during execution is identical for all execution paths that include the instruction regardless of the execution path taken to arrive at the instruction, and a type state of the stack when arriving at the instruction during execution of a first execution path that includes the instruction is compatible with a type state of the stack when arriving at the instruction during execution of all other execution paths that include the instruction; and
  executing or aborting execution of the program based on a result of the determination.

104. The method of claim 103, wherein when the program is executed no check is made to verify that when an instruction of the program is executed that can be executed along more than one execution path, a number of operands on a stack when arriving at that instruction is identical regardless of the execution path taken to arrive at the instruction, and no check is made during execution of the program that a type state of the stack when arriving at the instruction during execution of the first execution path is compatible with a type state of the stack when arriving at the instruction during execution of all other execution paths that include the instruction.

105. The method of claim 103, wherein when the program is executed no check is made for overflow and underflow of the stack.

106. The method of claim 103, wherein the executing includes executing the program without performing a check during execution of the program that corresponds to a check performed during the verification process.

107. The method of claim 103, wherein each instruction of the program comprises one or more bytecodes, and wherein the verification process determines whether execution of any bytecoded instruction in the program would violate predetermined data type restrictions for that instruction.

108. The method of claim 103, wherein at least one instruction of the program comprises one or more bytecodes that represent an operation on a specific data type and is selected from the group consisting of: aaload, aastore, aconst_null, aload, areturn, arraylength, astore, astore_<n>, athrow, bipush, breakpoint, catchsetup, catchteardown, checkcast, df2, d2i, d2l, dadd, daload, dastore, dcmpg, dcmpl, dconst_<d>, ddiv, dload, dload_<d>, dmod, dmul, dneg, dreturn, dstore, dstore_<n>, dsub, dup, dup2, dup2_x1, dup2_x2, dup_x1, dup_—x2, f2d, f2i, f2l, fadd, faload, fastore, fcmpg, fcmpl, fconst_<f>, fdiv, fload, fload_<n>, fmod, fmul, fneg, freturn, fstore, fstore_<n>, fsub, gatfield, getstatic, goto, i2d, i2f, i2l, iadd, iaload, iand, iastore, iconst_<n>, iconst_m1, idiv, if_acmpeq, if_acmpne, if_icmpeq, if_icmpge, if_icmpgt, if_icmple, if_icmplt, if_icmpne, ifeq, ifge, ifgt, ifle, iflt, ifne, iinc, iload, iload_<n>, imod, imul, ineg, instanceof, int2byte, int2char, invokeinterface, invokemethod, invokesuper, ior, ireturn, ishl, Ishr, istore, istore_<n>, isub, iushr, ixor, jsr, l2d, l2f, l2i, ladd, laload, land, lastore, lcmp, lconst_<l>, ldc1 ldc2, ldc2w, ldiv, lload, lload_<n>, lmod, lmul, lneg, lookupswitch, lor, lreturn, lshl, lshr, lstore, lstore_<n>, lsub, lushr, lxor, monitorenter, monitorexit, new, newarray, newfromname, nop, pop, pop2, putfield, putstatic, ret, return, saload, sastore, siaload, siastore, sipush, tableswitch, and verifystack.

109. A computer system, comprising:
  an interface for receiving a program formed of low-level, stack-oriented, program code;
  memory for storing the program;
  a data processing unit for executing programs stored in the memory;
  a first module for determining whether the program successfully completed a verification process, wherein the verification process verifies, prior to execution of the program, that when an instruction of the program is executed that can be executed along more than one execution path, a number of operands on a stack when arriving at that instruction during execution is identical for all execution paths that include the instruction regardless of the execution path taken to arrive at the instruction, and a type state of the stack when arriving at the instruction during execution of a first execution path that includes the instruction is compatible with a type state of the stack when arriving at the instruction during execution of all other execution paths that include the instruction; and
  a program execution module for executing or aborting based on a result generated by the first module.

110. The computer system of claim 109, wherein the verification process verifies that the number of operands on the stack when arriving at the instruction that can be executed along more than one execution path is identical for all execution paths that include the instruction, even when the stack is not empty prior to execution of the instruction.

111. The computer system of claim 109, wherein the verification process verifies that execution of any loop in the program will not result in a net addition or deletion of operands on the stack.

112. The computer system of claim 109, wherein the program execution module does not check for overflow and underflow of the stack when executing the verified program.

113. The computer system of claim 109, wherein the verification process verifies that when a loop of the program is executed, immediately before and after each iteration of the loop, a number of operands on the stack is identical, even when the stack is not empty, and a type state of the stack remains compatible with an initial type state of the stack regardless of how many times the loop is executed.

114. The computer system of claim 109, wherein the program execution module includes instructions for executing the program without performing a check during execution of the program that corresponds to a check performed by the program verifier.

115. The computer system of claim 109, wherein each instruction of the program comprises one or more bytecodes, and wherein the verification process determines whether execution of any bytecoded instruction in the program would violate predetermined data type restrictions for that instruction.

116. The computer system of claim 109, wherein at least one instruction of the program comprises one or more bytecodes that represent an operation on a specific data type and is selected from the group consisting of: aaload, aastore, aconst_null, aload, areturn, arraylength, astore, astore_<n>, athrow, bipush, breakpoint, catchsetup, catchteardown, checkcast, df2, d2i, d2l, dadd, daload, dastore, dcmpg, dcmpl, dconst_<d>, ddiv, dload, dload_<d>, dmod, dmul, dneg, dreturn, dstore, dstore_<n>, dsub, dup, dup2, dup2_x1, dup2_x2, dup_x1, dup_—x2, f2d, f2i, f2l, fadd, faload, fastore, fempg, fempl, fconst_<f>, fdiv, fload, fload_<n>, fmod, fmul, fneg, freturn, fstore, fstore_<n>, fsub, gatfield, getstatic, goto, i2d, i2f, i2l, iadd, iaload, iand, iastore, iconst_<n>, iconst_m1, idiv, if_acmpeq, if_acmpne, if_icmpeq, if_icmpge, if_icmpgt, if_icmple, if_icmplt, if_icmpne, ifeq, ifge, ifgt, ifle, iflt, ifne, iinc, iload, iload_<n>, imod, imul, ineg, instanceof, int2byte, int2char, invokeinterface, invokemethod, invokesuper, ior, ireturn, ishl, Ishr, istore, istore_<n>, isub, iushr, ixor, jsr, 12d, 12f, 12i, ladd, laload, land, lastore, lcmp, lconst_<l>, ldc1, ldc2, ldc2w, ldiv, lload, lload_<n>, lmod, lmul, lneg, lookupswitch, lor, lreturn, lshl, lshr, lstore, lstore_<n>, lsub, lushr, lxor, monitorenter, monitorexit, new, newarray, newfromname, nop, pop, pop2, putfield, putstatic, ret, return, saload, sastore, siaload, siastore, sipush, tableswitch, and verifystack.

117. The computer system of claim 109, wherein the verification process verifies that the program complies with a stack non-overflow constraint and a stack non-underflow constraint.

118. A computer program product for use in conjunction with a computer system, the computer program product comprising a computer readable storage medium and a computer program mechanism embedded therein, the computer program mechanism comprising:
   a first module for determining whether the program successfully completed a verification process, wherein the verification process verifies, prior to execution of the program, that when an instruction of the program is executed that can be executed along more than one execution path, a number of operands on a stack when arriving at that instruction during execution is identical for all execution paths that include the instruction regardless of the execution path taken to arrive at the instruction, and a type state of the stack when arriving at the instruction during execution of a first execution path that includes the instruction is compatible with a type state of the stack when arriving at the instruction during execution of all other execution paths that include the instruction; and
   a program execution module for executing or aborting based on a result generated by the first module.

119. The computer program product of claim 118, wherein the verification process verifies that the number of operands on the stack when arriving at the instruction that can be executed along more than one execution path is identical for all execution paths that include the instruction, even when the stack is not empty prior to execution of the instruction.

120. The computer program product of claim 118, wherein the verification process verifies that execution of any loop in the program will not result in a net addition or deletion of operands on the stack.

121. The computer program product of claim 118, wherein the program execution module does not check for overflow and underflow of the stack when executing the verified program.

122. The computer program product of claim 118, wherein the verification process verifies that when a loop of the program is executed, immediately before and after each iteration of the loop, a number of operands on the stack is identical, even when the stack is not empty, and a type state of the stack remains compatible with an initial type state of the stack regardless of how many times the loop is executed.

123. The computer program product of claim 118, wherein the program execution module includes instructions for executing the program without performing a check during execution of the program that corresponds to a check performed by the program verifier.

124. The computer program product of claim 118, wherein each instruction of the program comprises one or more bytecodes, and wherein the verification process determines whether execution of any bytecoded instruction in the program would violate predetermined data type restrictions for that instruction.

125. The computer program product of claim 118, wherein at least one instruction of the program comprises one or more bytecodes that represent an operation on a specific data type and is selected from the group consisting of: aaload, aastore, aconst_null, aload, areturn, arraylength, astore, astore_<n>, athrow, bipush, breakpoint, catchsetup, catchteardown, checkcast, df2, d2i, d2l, dadd, daload, dastore, dcmpg, dcmpl, dconst_<d>, ddiv, dload, dload_<d>, dmod, dmul, dneg, dreturn, dstore, dstore_<n>, dsub, dup, dup2, dup2_x1, dup2_x2, dup_x1, dup_—x2, f2d, f2i, f2l, fadd, faload, fastore, fempg, fempl, fconst_<f>, fdiv, fload, fload_<n>, fmod, fmul, fneg, freturn, fstore, fstore_<n>, fsub, gatfield, getstatic, goto, i2d, i2f, i2l, iadd, iaload, iand, iastore, iconst_<n>, iconst_m1, idiv, if_acmpeq, if_acmpne, if_icmpeq, if_icmpge, if_icmpgt, if_icmple, if_icmplt, if_icmpne, ifeq, ifge, ifgt, ifle, iflt, ifne, iinc, iload, iload_<n>, imod, imul, ineg, instanceof, int2byte, int2char, invokeinterface, invokemethod, invokesuper, ior, ireturn, ishl, Ishr, istore, istore_<n>, isub, iushr, ixor, jsr, 12d, 12f, 12i, ladd, laload, land, lastore, lcmp, lconst_<l>, ldc1, ldc2, ldc2w, ldiv, lload, lload_<n>, lmod, lmul, lneg, lookupswitch, lor, lreturn, lshl, lshr, lstore, lstore_<n>, lsub, lushr, lxor, monitorenter, monitorexit, new, newarray, newfromname, nop, pop, pop2, putfield, putstatic, ret, return, saload, sastore, siaload, siastore, sipush, tableswitch, and verifystack.

126. The computer program product of claim 118, wherein the verification process verifies that the program complies with a stack non-overflow constraint and a stack non-underflow constraint.

127. A method of operating a computer system, comprising the steps of:
   providing a program formed of low-level, stack-oriented, program code;
   verifying at run time, prior to execution, that when a loop of the program is executed that, immediately before and after each iteration of the loop, a number of operands on a stack is identical, even when the stack is not empty, and a type state of the stack before a first iteration of the loop is compatible with a type state of the stack after the each iteration of the loop regardless of how many times the loop is executed; and executing the verified program.

128. The method of claim 127, wherein the executing includes, when the program has been verified, executing the program without performing a check during execution of the program that corresponds to a check performed during the verifying.

129. The method of claim 127, wherein each instruction of the program comprises one or more bytecodes, and wherein the verifying includes determining whether execution of any bytecoded instruction in the program would violate predetermined data type restrictions for that instruction.

130. The method of claim 127, wherein at least one instruction of the program comprises one or more bytecodes that represent an operation on a specific data type and is selected from the group consisting of: aaload, aastore, aconst_null, aload, areturn, arraylength, astore, astore_<n>, athrow, bipush, breakpoint, catchsetup, catchteardown, checkcast, df2, d2i, d2l, dadd, daload, dastore, dcmpg, dcmpl, dconst_<d>, ddiv, dload, dload_<d>, dmod, dmul, dneg, dreturn, dstore, dstore_<n>, dsub, dup, dup2, dup2_x1, dup2_x2, dup_x1, dup_—x2, f2d, f2i, f2l, fadd, faload, fastore, fcmpg, fcmpl, fconst_<f>, fdiv, fload, fload_<n>, fmod, fmul, fneg, freturn, fstore, fstore_<n>, fsub, gatfield, getstatic, goto, i2d, i2f, i2l, iadd, iaload, iand, iastore, iconst_<n>, iconst_m1, idiv, if_acmpeq, if_acmpne, if_icmpeq, if_icmpge, if_icmpgt, if_icmple, if_icmplt, if_icmpne, ifeq, ifge, ifgt, ifle, iflt, ifne, iinc, iload, iload_<n>, imod, imul, ineg, instanceof, int2byte, int2char, invokeinterface, invokemethod, invokesuper, ior, ireturn, ishl, Ishr, istore, istore_<n>, isub, iushr, ixor, jsr, l2d, l2f, l2i, ladd, laload, land, lastore, lcmp, lconst_<l>, ldc1, ldc2, ldc2w, ldiv, lload, lload_<n>, lmod, lmul, lneg, lookupswitch, lor, lreturn, lshl, lshr, lstore, lstore_<n>, lsub, lushr, lxor, monitorenter, monitorexit, new, newarray, newfromname, nop, pop, pop2, putfield, putstatic, ret, return, saload, sastore, siaload, siastore, sipush, tableswitch, and verifystack.

131. The method of claim 127, wherein the verifying includes certifying that the program complies with a stack non-overflow constraint and a stack non-underflow constraint.

132. The method of claim 127, wherein the verifying is performed using a virtual stack to track the type state of the stack.

133. The method of claim 127, wherein the verifying is performed using an array of virtual local variables to track a type state of local variables used by the program.

134. The method of claim 127, wherein the program is platform independent, and wherein the providing includes receiving the program from a remote device.

135. The method of claim 127, wherein the providing includes receiving the program from a remote device.

136. A computer system, comprising:

memory for storing a program formed of low-level, stack-oriented, program code;

a data processing unit for executing programs stored in the memory;

a program verifier, stored in the memory and executed by the data processing unit, the program verifier including instructions for verifying prior to execution that when a loop of the program is executed that, immediately before and after each iteration of the loop, a number of operands on a stack is identical, even when the stack is not empty, and a type state of the stack before a first iteration of the loop is compatible with a type state of the stack after the each iteration of the loop regardless of how many times the loop is executed; and a program execution module for executing the verified program.

137. The computer system of claim 136, including a program execution module for executing the program, when the program has been verified by the program verifier, without performing a check during execution of the program that corresponds to a check performed by the program verifier.

138. The computer system of claim 136, wherein each instruction of the program comprises one or more bytecodes, and wherein the program verifier includes instructions for determining whether execution of any bytecoded instruction in the program would violate predetermined data type restrictions for that instruction.

139. The computer system of claim 136, wherein at least one instruction of the program comprises one or more bytecodes that represent an operation on a specific data type and is selected from the group consisting of: aaload, aastore, aconst_null, aload, areturn, arraylength, astore, astore_<n>, athrow, bipush, breakpoint, catchsetup, catchteardown, checkcast, df2, d2i, d2l, dadd, daload, dastore, dcmpg, dcmpl, dconst_<d>, ddiv, dload, dload_<d>, dmod, dmul, dneg, dreturn, dstore, dstore_<n>, dsub, dup, dup2, dup2_x1, dup2_x2, dup_x1, dup_—x2, f2d, f2i, f2l, fadd, faload, fastore, fcmpg, fcmpl, fconst_<f>, fdiv, fload, fload_<n>, fmod, fmul, fneg, freturn, fstore, fstore_<n>, fsub, gatfield, getstatic, goto, i2d, i2f, i2l, iadd, iaload, iand, iastore, iconst_<n>, iconst_m1, idiv, if_acmpeq, if_acmpne, if_icmpeq, if_icmpge, if_icmpgt, if_icmple, if_icmplt, if_icmpne, ifeq, ifge, ifgt, ifle, iflt, ifne, iinc, iload, iload_<n>, imod, imul, ineg, instanceof, int2byte, int2char, invokeinterface, invokemethod, invokesuper, ior, ireturn, ishl, Ishr, istore, istore_<n>, isub, iushr, ixor, jsr, l2d, l2f, l2i, ladd, laload, land, lastore, lcmp, lconst_<l>, ldc1, ldc2, ldc2w, ldiv, lload, lload_<n>, lmod, lmul, lneg, lookupswitch, lor, lreturn, lshl, lshr, lstore, lstore_<n>, lsub, lushr, lxor, monitorenter, monitorexit, new, newarray, newfromname, nop, pop, pop2, putfield, putstatic, ret, return, saload, sastore, siaload, siastore, sipush, tableswitch, and verifystack.

140. The computer system of claim 136, wherein the program verifier includes instructions for certifying that the program complies with a stack non-overflow constraint and a stack non-underflow constraint.

141. The computer system of claim 136, wherein the program verifier includes instructions using a virtual stack to track the type state of the stack.

142. The computer system of claim 136, wherein the program verifier includes instructions using an array of virtual local variables to track a type state of local variables used by the program.

143. A computer program product for use in conjunction with a computer system, the computer program product comprising a computer readable storage medium and a computer program mechanism embedded therein, the computer program mechanism comprising:

a program verifier, for analyzing a program formed of low-level, stack-oriented, program code; the program verifier including instructions for verifying prior to execution of the program that when a loop of the program is executed that, immediately before and after each iteration of the loop, a number of operands on a stack is identical, even when the stack is not empty, and a type state of the stack before a first iteration of the loop is compatible with a type state of the stack after the each iteration of the loop regardless of how many times the loop is executed; and a program execution module for executing the verified program.

144. The computer program product of claim 143, including a program execution module for executing the program, when the program has been verified by the program verifier, without performing a check during execution of the program that corresponds to a check performed by the program verifier.

145. The computer program product of claim 143, wherein each instruction of the program comprises one or more bytecodes, and wherein the program verifier includes instructions for determining whether execution of any bytecoded instruction in the program would violate predetermined data type restrictions for that instruction.

146. The computer program product of claim 143, wherein at least one instruction of the program comprises one or more bytecodes that represent an operation on a specific data type and is selected from the group consisting of: aaload, aastore, aconst__null, aload, areturn, arraylength, astore, astore__<n>, athrow, bipush, breakpoint, catchsetup, catchteardown, checkcast, df2, d2i, d2l, dadd, daload, dastore, dcmpg, dcmpl, dconst__<d>, ddiv, dload, dload__<d>, dmod, dmul, dneg, dreturn, dstore, dstore__<n>, dsub, dup, dup2, dup2__x1, dup2__x2, dup__x1, dup__—x2, f2d, f2i, f2l, fadd, faload, fastore, fempg, fempl, fconst <f>, fdiv, fload, fload__<n>, fmod, fmul, fneg, freturn, fstore, fstore__<n>, fsub, gatfield, getstatic, goto, i2d, i2f, i2l, iadd, iaload, iand, iastore, iconst__<n>, iconst__m1, idiv, if__acmpeq, if__acmpne, if__icmpeq, if__icmpge, if__icmpgt, if__icmple, if__icmplt, if__icmpne, ifeq, ifge, ifgt, ifle, iflt, ifne, iinc, iload, iload__<n>, imod, imul, ineg, instanceof, int2byte, int2char, invokeinterface, invokemethod, invokesuper, ior, ireturn, ishl, Ishr, istore, istore__<n>, isub, iushr, ixor, jsr, l2d, l2f, l2i, ladd, laload, land, lastore, lcmp, lconst__<l>, ldc1, ldc2, ldc2w, ldiv, lload, lload__<n>, lmod, lmul, lneg, lookupswitch, lor, lreturn, lshl, lshr, lstore, lstore__<n>, lsub, lushr, lxor, monitorenter, monitorexit, new, newarray, newfromname, nop, pop, pop2, putfield, putstatic, ret, return, saload, sastore, siaload, siastore, sipush, tableswitch, and verifystack.

147. The computer program product of claim 143, wherein the program verifier includes instructions for certifying that the program complies with a stack non-overflow constraint and a stack non-underflow constraint.

148. The computer program product of claim 143, wherein the program verifier includes instructions using a virtual stack to track the type state of the stack.

149. The computer program product of claim 143, wherein the program verifier includes instructions using an array of virtual local variables to track a type state of local variables used by the program.

150. A method of operating a computer system, comprising:

receiving a program formed of low-level, stack-oriented, program code from a server over a network;

determining whether the program successfully completed a verification process, wherein the verification process verifies, prior to execution of the program, that when a loop of the program is executed that, immediately before and after each iteration of the loop, a number of operands on a stack is identical and a type state of the stack before a first iteration of the loop is compatible with a type state of the stack after the each iteration of the loop regardless of how many times the loop is executed; and executing or aborting execution of the program based on a result of the determination.

151. The method of claim 150, wherein when the program is executed no check is made to verify that when a loop of the program is executed that, immediately before and after each iteration of the loop, a number of operands on the stack is identical and no check is made to verify that a type state of the stack before a first iteration of the loop is compatible with a type state of the stack after the each iteration of the loop regardless of how many times the loop is executed.

152. The method of claim 150, wherein each instruction of the program comprises one or more bytecodes, and wherein the verification process determines whether execution of any bytecoded instruction in the program would violate predetermined data type restrictions for that instruction.

153. The method of claim 150, wherein at least one instruction of the program comprises one or more bytecodes that represent an operation on a specific data type and is selected from the group consisting of: aaload, aastore, aconst__null, aload, areturn, arraylength, astore, astore__<n>, athrow, bipush, breakpoint, catchsetup, catchteardown, checkcast, df2, d2i, d2l, dadd, daload, dastore, dcmpg, dcmpl, dconst__<d>, ddiv, dload, dload__<d>, dmod, dmul, dneg, dreturn, dstore, dstore__<n>, dsub, dup, dup2, dup2__x1, dup2__x2, dup__x1, dup__—x2, f2d, f2i, f2l, fadd, faload, fastore, fempg, fempl, fconst__<f>, fdiv, fload, fload__<n>, fmod, fmul, fneg, freturn, fstore, fstore__<n>, fsub, gatfield, getstatic, goto, i2d, i2f, i2l, iadd, iaload, iand, iastore, iconst__<n>, iconst__m1, idiv, if__acmpeq, if__acmpne, if__icmpeq, if__icmpge, if__icmpgt, if__icmple, if__icmplt, if__icmpne, ifeq, ifge, ifgt, ifle, iflt, ifne, iinc, iload, iload__<n>, imod, imul, ineg, instanceof, int2byte, int2char, invokeinterface, invokemethod, invokesuper, ior, ireturn, ishl, Ishr, istore, istore__<n>, isub, iushr, ixor, jsr, l2d, l2f, l2i, ladd, laload, land, lastore, lcmp, lconst__<l>, ldc1, ldc2, ldc2w, ldiv, lload, lload__<n>, lmod, lmul, lneg, lookupswitch, lor, lreturn, lshl, lshr, lstore, lstore__<n>, lsub, lushr, lxor, monitorenter, monitorexit, new, newarray, newfromname, nop, pop, pop2, putfield, putstatic, ret, return, saload, sastore, siaload, siastore, sipush, tableswitch, and verifystack.

154. The method of claim 150, wherein the verification process certifies that the program complies with a stack non-overflow constraint and a stack non-underflow constraint.

155. The method of claim 150, wherein the verification process uses a virtual stack to track the type state of the stack.

156. The method of claim 150, wherein the verification process uses an array of virtual local variables to track a type state of local variables used by the program.

157. The method of claim 127, wherein the program is platform independent, and wherein the providing includes receiving the program from a remote device.

158. The method of claim 127, wherein the providing includes receiving the program from a remote device.

159. A computer system, comprising:

an interface for receiving a program formed of low-level, stack-oriented, program code;

memory for storing the program;

a data processing unit for executing programs stored in the memory;

a first module for determining whether the program successfully completed a verification process, wherein the verification process verifies, prior to execution of the program, that when a loop of the program is executed that, immediately before and after each iteration of the loop, a number of operands on a stack is identical, even when the stack is not empty, and a type state of the stack before a first iteration of the loop is compatible with a type state of the stack after the each iteration of the loop regardless of how many times the loop is executed; and a program execution module for executing or aborting execution of the program based on a result of the determination.

160. The computer system of claim 159, wherein the program execution module is configured to execute the program without checking to verify that when a loop of the program is executed that, immediately before and after each iteration of the loop, a number of operands on the stack is identical and without checking to verify that a type state of the stack before a first iteration of the loop is compatible with a type state of the stack after the each iteration of the loop regardless of how many times the loop is executed.

161. The computer system of claim 159, wherein each instruction of the program comprises one or more bytecodes, and wherein the verification process determines whether execution of any bytecoded instruction in the program would violate predetermined data type restrictions for that instruction.

162. The computer system of claim 159, wherein at least one instruction of the program comprises one or more bytecodes that represent an operation on a specific data type and is selected from the group consisting of: aaload, aastore, aconst_null, aload, areturn, arraylength, astore, astore_<n>, athrow, bipush, breakpoint, catchsetup, catchteardown, checkcast, df2, d2i, d2l, dadd, daload, dastore, dcmpg, dcmpl, dconst_<d>, ddiv, dload, dload_<d>, dmod, dmul, dneg, dreturn, dstore, dstore_<n>, dsub, dup, dup2, dup2_x1, dup2_x2, dup_x1, dup_—x2, f2d, f2i, f2l, fadd, faload, fastore, fempg, fempl, fconst_<f>, fdiv, fload, fload_<n>, fmod, fmul, fneg, freturn, fstore, fstore_<n>, fsub, gatfield, getstatic, goto, i2d, i2f, i2l, iadd, iaload, iand, iastore, iconst_<n>, iconst_m1, idiv, if_acmpeq, if_acmpne, if_icmpeq, if_icmpge, if_icmpgt, if_icmple, if_icmplt, if_icmpne, ifeq, ifge, ifgt, ifle, iflt, ifne, iinc, iload, iload_<n>, imod, imul, ineg, instanceof, int2byte, int2char, invokeinterface, invokemethod, invokesuper, ior, ireturn, ishl, lshr, istore, istore_<n>, isub, iushr, ixor, jsr, l2d, l2f, l2i, ladd, laload, land, lastore, lcmp, lconst_<l>, ldc1, ldc2, ldc2w, ldiv, lload, lload_<n>, lmod, lmul, lneg, lookupswitch, lor, lreturn, lshl, lshr, lstore, lstore_<n>, lsub, lushr, lxor, monitorenter, monitorexit, new, newarray, newfromname, nop, pop, pop2, putfield, putstatic, ret, return, saload, sastore, siaload, siastore, sipush, tableswitch, and verifystack.

163. The computer system of claim 159, wherein the verification process certifies that the program complies with a stack non-overflow constraint and a stack non-underflow constraint.

164. The computer system of claim 159, wherein the verification process uses a virtual stack to track the type state of the stack.

165. The computer system of claim 159, wherein the verification process uses an array of virtual local variables to track a type state of local variables used by the program.

166. A computer program product for use in conjunction with a computer system, the computer program product comprising a computer readable storage medium and a computer program mechanism embedded therein, the computer program mechanism comprising:

a first module for determining whether the program successfully completed a verification process, wherein the verification process verifies, prior to execution of the program, that when a loop of the program is executed that, immediately before and after each iteration of the loop, a number of operands on a stack is identical, even when the stack is not empty, and a type state of the stack before a first iteration of the loop is compatible with a type state of the stack after the each iteration of the loop regardless of how many times the loop is executed; and a program execution module for executing or aborting execution of the program based on a result of the determination.

167. The computer program product of claim 166, wherein the program execution module is configured to execute the program without checking to verify that when a loop of the program is executed that, immediately before and after each iteration of the loop, a number of operands on the stack is identical and without checking to verify that a type state of the stack before a first iteration of the loop is compatible with a type state of the stack after the each iteration of the loop regardless of how many times the loop is executed.

168. The computer program product of claim 166, wherein each instruction of the program comprises one or more bytecodes, and wherein the verification process determines whether execution of any bytecoded instruction in the program would violate predetermined data type restrictions for that instruction.

169. The computer program product of claim 166, wherein at least one instruction of the program comprises one or more bytecodes that represent an operation on a specific data type and is selected from the group consisting of: aaload, aastore, aconst_null, aload, areturn, arraylength, astore, astore_<n>, athrow, bipush, breakpoint, catchsetup, catchteardown, checkcast, df2, d2i, d2l, dadd, daload, dastore, dcmpg, dcmpl, dconst_<d>, ddiv, dload, dload_<d>, dmod, dmul, dneg, dreturn, dstore, dstore_<n>, dsub, dup, dup2, dup2_x1, dup2_x2, dup_x1, dup_—x2, f2d, f2i, f2l, fadd, faload, fastore, fempg, fempl, fconst_<f>, fdiv, fload, fload_<n>, fmod, fmul, fneg, freturn, fstore, fstore_<n>, fsub, gatfield, getstatic, goto, i2d, i2f, i2l, iadd, iaload, iand, iastore, iconst_<n>, iconst_m1, idiv, if_acmpeq, if_acmpne, if_icmpeq, if_icmpge, if_icmpgt, if_icmple, if_icmplt, if_icmpne, ifeq, ifge, ifgt, ifle, iflt, ifne, iinc, iload, iload_<n>, imod, imul, ineg, instanceof, int2byte, int2char, invokeinterface, invokemethod, invokesuper, ior, ireturn, ishl, lshr, istore, istore_<n>, isub, iushr, ixor, jsr, l2d, l2f, l2i, ladd, laload, land, lastore, lcmp, lconst_<l>, ldc1, ldc2, ldc2w, ldiv, lload, lload_<n>, lmod, lmul, lneg, lookupswitch, lor, lreturn, lshl, lshr, lstore, lstore_<n>, lsub, lushr, lxor, monitorenter, monitorexit, new, newarray, newfromname, nop, pop, pop2, putfield, putstatic, ret, return, saload, sastore, siaload, siastore, sipush, tableswitch, and verifystack.

170. The computer program product of claim 166, wherein the verification process certifies that the program complies with a stack non-overflow constraint and a stack non-underflow constraint.

171. The computer program product of claim 166, wherein the verification process uses a virtual stack to track the type state of the stack.

172. The computer program product of claim 166, wherein the verification process uses an array of virtual local variables to track a type state of local variables used by the program.

* * * * *